(12) United States Patent
Moon et al.

(10) Patent No.: US 11,983,436 B2
(45) Date of Patent: May 14, 2024

(54) MEMORY CONTROLLER AND MEMORY SYSTEM

(71) Applicant: SAMSUNG ELECTRONICS CO., LTD., Suwon-si (KR)

(72) Inventors: Youngsuk Moon, Yongin-si (KR); Jaegeun Park, Suwon-si (KR); Jongin Lee, Yongin-si (KR); Sangmuk Hwang, Jeonju-si (KR)

(73) Assignee: Samsung Electronics Co., Ltd. (KR)

( * ) Notice: Subject to any disclaimer, the term of this patent is extended or adjusted under 35 U.S.C. 154(b) by 29 days.

(21) Appl. No.: 17/827,841

(22) Filed: May 30, 2022

(65) Prior Publication Data

US 2023/0168838 A1    Jun. 1, 2023

(30) Foreign Application Priority Data

Dec. 1, 2021 (KR) .......................... 10-2021-0170250

(51) Int. Cl.
G06F 3/06            (2006.01)

(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0656; G06F 3/0604; G06F 3/0679; G06F 2212/7202; G06F 2212/7205; G06F 2212/7207; G06F 2212/7208; G06F 12/0246

See application file for complete search history.

(56) References Cited

U.S. PATENT DOCUMENTS

| | | | |
|---|---|---|---|
| 6,781,914 B2 | 8/2004 | Ha | |
| 8,055,816 B2 | 11/2011 | Asnaashari et al. | |
| 8,554,987 B2 | 10/2013 | So et al. | |
| 9,817,700 B2 | 11/2017 | Caufield et al. | |
| 2008/0209157 A1 | 8/2008 | Weng | |
| 2011/0072196 A1* | 3/2011 | Forhan | G06F 13/14 |
| | | | 711/E12.019 |
| 2016/0034227 A1 | 2/2016 | Olbrich et al. | |
| 2018/0260343 A1* | 9/2018 | Park | G06F 13/1668 |

(Continued)

OTHER PUBLICATIONS

European Search Reported dated Dec. 23, 2022 From Euroopean Patent Office Cited in Corresponding European Patent Application No. 22185920.0.

(Continued)

*Primary Examiner* — Francisco A Grullon

(74) *Attorney, Agent, or Firm* — Fish & Richardson P.C.

(57) ABSTRACT

A memory controller includes a buffer memory including memory banks, one or more host access units configured to perform an access to the buffer memory for a host, one or more memory access units configured to perform an access to the buffer memory for a memory device, and a processor configured to control an operation of the memory controller. The processor divides the memory banks into an external memory bank group for an external operation related to the host, and an internal memory bank group for an internal operation within a memory system. The host access units access the external memory bank group. The memory access units access the external memory bank group to perform the external operation, and access the internal memory bank group to perform the internal operation.

20 Claims, 19 Drawing Sheets

(56) References Cited

U.S. PATENT DOCUMENTS

2020/0341635 A1  10/2020  Sundaram et al.
2021/0004323 A1  1/2021   Kang

OTHER PUBLICATIONS

Lei Liu et al., "BPM/BPM+: Software-Based Dynamic Memory Partitioning Mechanisms for Mitigating DRAM Bank-/ Channel-Level Interferences in Multicore Systems," ACM Transactions on Architecture and Code Optimization, vol. 11, No. 1, Article 5, Publication date: Feb. 2014.

* cited by examiner

FIG. 2
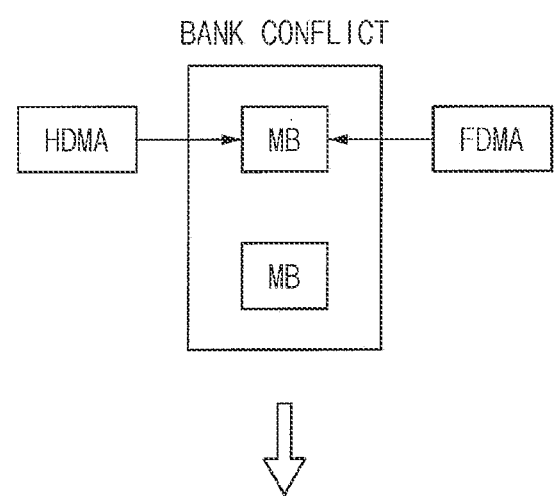
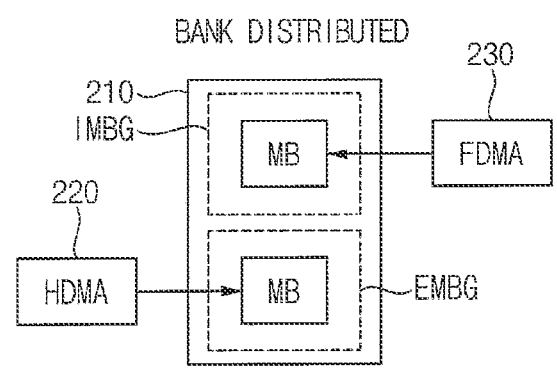

MEMORY CONTROLLER AND MEMORY SYSTEM

CROSS-REFERENCE TO RELATED APPLICATION

This application claims priority under 35 USC § 119 to Korean Patent Application No. 10-2021-0170250, filed on Dec. 1, 2021 in the Korean Intellectual Property Office (KIPO), the contents of which are herein incorporated by reference in their entirety.

BACKGROUND

1. Technical Field

Exemplary embodiments relate generally to semiconductor integrated circuits, and more particularly to a memory controller for a memory system.

2. Description of the Related Art

Semiconductor memory devices can be roughly divided into two categories depending upon whether or not they retain stored data when disconnected from a power supply. These two categories are: volatile memory devices, which lose stored data when disconnected from power, and non-volatile memory devices, which retain stored data when disconnected from power. Volatile memory devices may perform read and write operations at a high speed, while contents stored therein may be lost at power-off. Nonvolatile memory devices may retain contents stored therein even at power-off, which means they may be used to store data that must be retained regardless of whether they are powered or not.

A semiconductor memory device may be controlled by a memory controller. The memory controller may temporarily store data received from a host in a buffer memory, and may write the data stored in the buffer memory to the semiconductor memory device. The memory controller may temporarily store data read from the semiconductor memory device in the buffer memory, and may transfer the data stored in the buffer memory to the host. Further, the memory controller may use the buffer memory to temporarily store data of the semiconductor memory device in order to perform an internal operation, such as a garbage collection operation.

SUMMARY OF THE INVENTION

At least one exemplary embodiment of the present disclosure provides a memory controller capable of preventing or reducing a timing overhead of a command signal.

At least one exemplary embodiment of the present disclosure provides a memory system including the memory controller.

According to exemplary embodiments, a memory controller of a memory system including a memory device and the memory controller includes a buffer memory including memory banks, one or more host access units configured to perform an access to the buffer memory for a host, one or more memory access units configured to perform an access to the buffer memory for the memory device, and a processor configured to control an operation of the memory controller. The processor divides the memory banks into an external memory bank group for an external operation related to the host, and an internal memory bank group for an internal operation within the memory system. The host access units access the external memory bank group. The memory access units access the external memory bank group to perform the external operation, and access the internal memory bank group to perform the internal operation.

According to exemplary embodiments, a memory controller of a memory system including a memory device and the memory controller includes a buffer memory including memory banks, one or more host access units configured to perform an access to the buffer memory for a host, one or more memory access units configured to perform an access to the buffer memory for the memory device, and a processor configured to control an operation of the memory controller. The processor includes a host access manager configured to control the host access units, a memory access manager configured to control the memory access units, and a buffer allocator configured to manage whether each of buffers of the memory banks of the buffer memory is available. The processor divides the memory banks into an external memory bank group for an external operation related to the host, and an internal memory bank group for an internal operation within the memory system. The host access manager manages external bank index pools respectively corresponding to the memory banks within the external memory bank group. The memory access manager manages internal bank index pools respectively corresponding to the memory banks within the internal memory bank group. The host access units access the external memory bank group based on a first buffer index within the external bank index pools received from the host access manager. The memory access units access the external memory bank group based on the first buffer index received through the memory access manager from the host access manager to perform the external operation, and access the internal memory bank group based on a second buffer index within the internal bank index pools received from the memory access manager to perform the internal operation.

According to exemplary embodiments, a memory system includes a memory device, and a memory controller configured to control an operation of the memory device. The memory controller includes a buffer memory including memory banks, one or more host access units configured to perform an access to the buffer memory for a host, one or more memory access units configured to perform an access to the buffer memory for the memory device, and a processor configured to control an operation of the memory controller. The processor divides the memory banks into an external memory bank group for an external operation related to the host, and an internal memory bank group for an internal operation within the memory system. The host access units access the external memory bank group. The memory access units access the external memory bank group to perform the external operation, and access the internal memory bank group to perform the internal operation.

In a memory controller and a memory system according to exemplary embodiments, a processor of the memory controller may divide memory banks of a buffer memory into an external memory bank group for an external operation and an internal memory bank group for an internal operation. Host access units of the memory controller may access the external memory bank group. Memory access units of the memory controller may access the external memory bank group to perform the external operation, and may access the internal memory bank group to perform the internal operation. Accordingly, in the memory system, a bank conflict in which the host and memory access units simultaneously access the same memory bank may be prevented, and utilization of the buffer memory may be improved.

BRIEF DESCRIPTION OF THE DRAWINGS

Illustrative, non-limiting exemplary embodiments will be more clearly understood from the following detailed description taken in conjunction with the accompanying drawings.

FIG. 2 is a diagram for describing an example of a memory bank allocation operation for a buffer memory by a memory controller illustrated in FIG. 1.

DETAILED DESCRIPTION OF THE PREFERRED EMBODIMENTS

Figure 1:
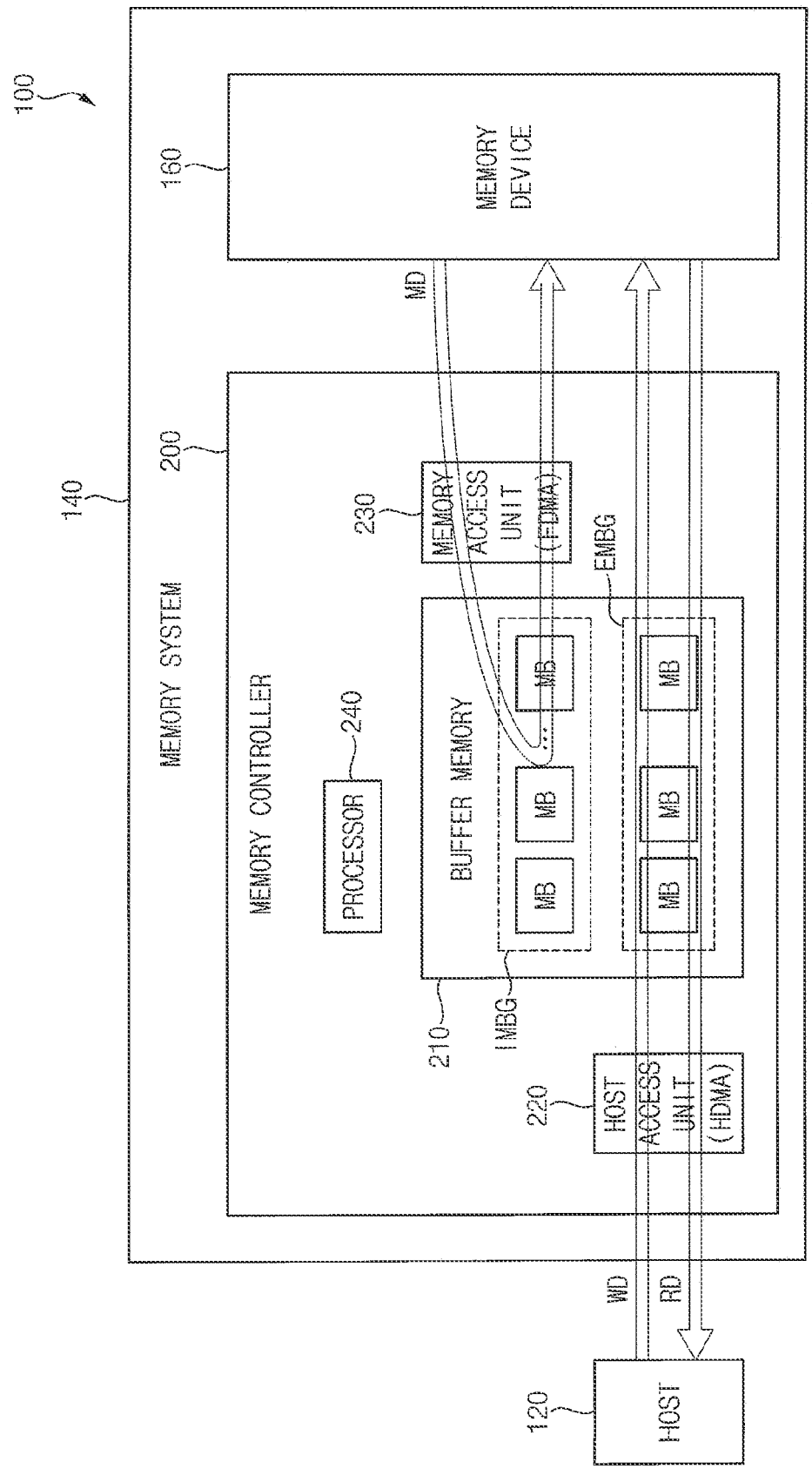
FIG. 1 is a block diagram illustrating a memory system including a memory controller and an electronic system including the memory system according to exemplary embodiments.

Various exemplary embodiments will be described more fully with reference to the accompanying drawings, in which such embodiments are shown. The present disclosure may, however, be embodied in many different forms and should not be construed as limited to the embodiments set forth herein. Like reference numerals refer to like elements throughout this application.

FIG. 1 is a block diagram illustrating a memory system including a memory controller and an electronic system including the memory system according to exemplary embodiments, and FIG. 2 is a diagram for describing an example of a memory bank allocation operation for a buffer memory by a memory controller illustrated in FIG. 1.

Referring to FIG. 1, an electronic system 100 may include a host 120 and a memory system 140. The host 120 may write data (or write data WD) to the memory system 140, and may read data (or read data RD) from the memory system 140. In some exemplary embodiments, the electronic system 100 may be any computing system, such as a personal computer (PC), a server computer, a data center, a workstation, a digital television (TV), a set-top box, etc. In other exemplary embodiments, the electronic system 100 may be any mobile system, such as a mobile phone, a smart phone, a tablet computer, a laptop computer, a personal digital assistant (PDA), a portable multimedia player (PMP), a digital camera, a camcorder, a portable game console, a music player, a video player, a navigation device, a wearable device, an internet of things (IoT) device, an internet of everything (IoE) device, an e-book reader, a virtual reality (VR) device, an augmented reality (AR) device, a robotic device, a drone, etc.

The memory system 140 may include a memory device 160, and a memory controller 200 that controls the memory device 160. In some exemplary embodiments, the memory system 140 may be a storage device. For example, the memory system 140 may be a solid state drive (SSD), a universal flash storage (UFS), a multi media card (MMC), an embedded MMC (eMMC), or the like. In a case where the memory system 140 is an SSD, the memory system 140 may be a device that conforms to a nonvolatile memory express (NVMe) standard. In other examples, the memory system 140 may be implemented with a secure digital (SD) card, a micro SD card, a memory stick, a chip card, a universal serial bus (USB) card, a smart card, a compact flash (CF) card, or the like.

The memory device 160 may store the write data WD received from the host 120. Further, the read data RD read from the memory device 160 may be provided to the host 120. In some exemplary embodiments, the memory device 160 may include one or more nonvolatile memory devices. For example, the memory device 160 may include a NAND flash memory, an electrically erasable programmable read-only memory (EEPROM), a phase change random access memory (PRAM), a resistive random access memory (RRAM), a nano floating gate memory (NFGM), a polymer random access memory (PoRAM), a magnetic random access memory (MRAM), a ferroelectric random access memory (FRAM), or the like.

The memory controller 200 may include a buffer memory 210, at least one host access unit 220, at least one memory access unit 230 and a processor 240. In some exemplary embodiments, the memory controller 200 may further include a flash translation layer (FTL), an error correction code (ECC) engine, an advanced encryption standard (AES) engine, a working memory, etc.

The buffer memory 210 may temporarily store the write data WD received from the host 120. The write data WD stored in the buffer memory 210 may be written to the memory device 160. Further, the buffer memory 210 may temporarily store the read data RD read from the memory device 160. The read data RD stored in the buffer memory 210 may be provided to the host 120. Further, to perform an internal operation, such as a garbage collection operation, the buffer memory 210 may temporarily store data (or memory data MD) of the memory device 160.

In some exemplary embodiments, the buffer memory 210 may be implemented with, but not limited to, a volatile memory device, such as a dynamic random access memory (DRAM). The buffer memory 210 may include a plurality of memory banks MB. Each memory bank MB may include a plurality of buffers. Each buffer may be, but not limited to, one row of memory cells in the memory bank MB. Each data WD, RD and MD may be stored in each buffer of the buffer memory 210. Although data write/read operations for buffers within the same memory bank MB are not simultaneously performed, data write/read operations for buffers within different memory banks MB may be substantially simultaneously performed.

The host access unit 220 may perform an access to the buffer memory 210 for the host 120. For example, the host access unit 220 may access the buffer memory 210 to store the write data WD received from the host 120 in the buffer memory 210. Further, the host access unit 220 may access the buffer memory 210 to read the read data RD to be provided to the host 120 from the buffer memory 210. In some exemplary embodiments, the host access unit 220 may directly access the buffer memory 210, and may thus be referred to as a host direct memory access (HDMA).

The memory access unit 230 may perform an access to the buffer memory 210 for the memory device 160. For example, the memory access unit 230 may access the buffer memory 210 to store the read data RD read from the memory device 160. The memory access unit 230 may access the buffer memory 210 to read the write data WD to be written to the memory device 160 from the buffer memory 210. Further, the memory access unit 230 may access the buffer memory 210 to perform an internal operation on the memory data MD that are not transmitted to the host 120 and are not received from the host 120. In some exemplary embodiments, the memory access unit 230 may directly access the buffer memory 210, the memory device 160 may include at least one flash memory, and the memory access unit 230 may thus be referred to as a flash direct memory access (FDMA).

The processor 240 may control an operation of the memory controller 200 in response to a command received from the host 120. In some exemplary embodiments, the processor 240 may be, but is not limited to, a central processing unit (CPU).

In the memory controller 200 according to exemplary embodiments, the processor 240 may divide the memory banks MB of the buffer memory 210 into an external memory bank group EMBG for an external operation related to the host 120, and an internal memory bank group IMBG for an internal operation within the memory system 140. Here, the external operation may be an operation on the data WD and RD transferred between the host 120 and the memory system 140. In some exemplary embodiments, the external operation may include a data write operation that writes the write data WD received from the host 120 to the memory device 160, and a data read operation that provides the read data RD read from the memory device 160 to the host 120. Further, the internal operation may be an operation on the memory data MD that is not transmitted to the host 120 and is not received from the host 120. In some exemplary embodiments, the internal operation may include a garbage collection operation that copies the memory data MD in one block of the memory device 160 to another block and obtains a free block by erasing the one block. In other exemplary embodiments, the internal operation may further include a data migration operation that moves the memory data MD in one region to another region when the one region of the memory device 160 is set not to be used. In still other exemplary embodiments, the internal operation may further include an on-chip buffer operation that moves the memory data MD in a single level cell (SLC) region of the memory device 160 to a multi-level cell (MLC) region of the memory device 160.

To perform the external operation, the host access unit 220 may access the external memory bank group EMBG of the buffer memory 210, and the memory access unit 230 may access the external memory bank group EMBG of the buffer memory 210. For example, the host access unit 220 may write the write data WD received from the host 120 to the memory banks MB within the external memory bank group EMBG, and the memory access unit 230 may read the write data WD from the memory banks MB within the external memory bank group EMBG. Further, the memory access unit 230 may write the read data RD read from the memory device 160 to the memory banks MB within the external memory bank group EMBG, and the host access unit 220 may read the read data RD from the memory banks MB within the external memory bank group EMBG.

To perform the internal operation, the memory access unit 230 may access the internal memory bank group IMBG of the buffer memory 210. For example, the memory access unit 230 may write the memory data MD in one region of the memory device 160 to the memory banks MB within the internal memory bank group IMBG. Further, to write the memory data MD stored in the buffer memory 210 to another region of the memory device 160, the memory access unit 230 may read the memory data MD from the memory banks MB within the internal memory bank group IMBG.

In a conventional memory system, as illustrated in FIG. 2, a host access unit (or HDMA) and a memory access unit (or FDMA) may access the same memory bank of a buffer memory. That is, in the conventional memory system, a bank conflict in which different access units access the same memory bank may occur. In this case, since the memory bank cannot perform an operation for the HDMA and an operation for the FDMA, utilization of the buffer memory of the conventional memory system may be impaired.

However, in the memory system 140 according to exemplary embodiments, the memory banks MB of the buffer memory 210 may be divided into the external memory bank group EMBG for the external operation and the internal memory bank group IMBG for the internal operation, and the host access unit 220 performing the external operation and the memory access unit 230 performing the internal operation may access different memory banks MB. Accordingly, the bank conflict may be prevented or avoided, the external operation and the internal operation may be substantially simultaneously performed, and the utilization of the buffer memory 210 may be improved.

Figure 3:
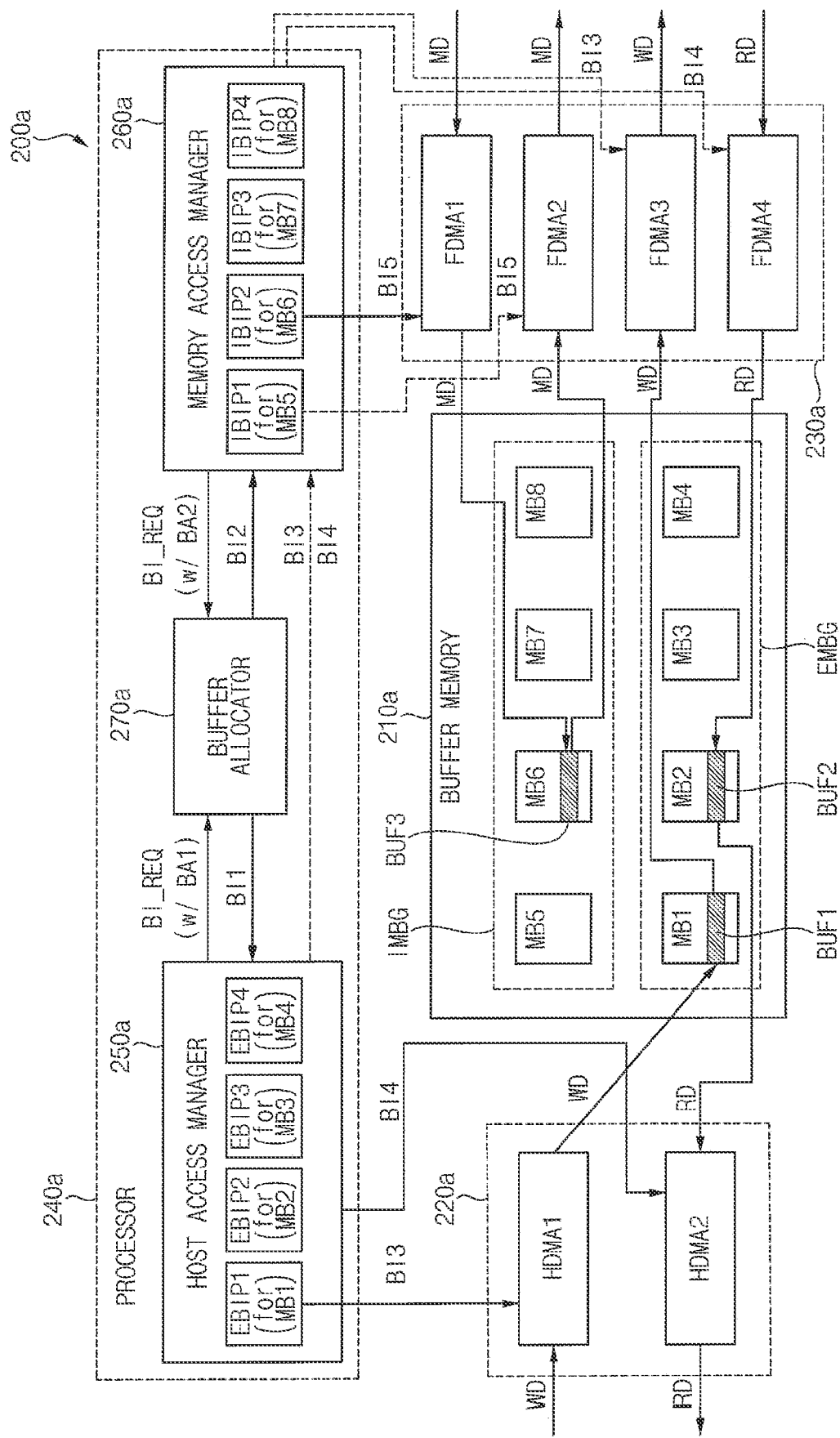
FIG. 3 is a block diagram illustrating a memory controller according to exemplary embodiments.

FIG. 3 is a block diagram illustrating a memory controller according to exemplary embodiments.

Referring to FIG. 3, a memory controller 200a may include a buffer memory 210a, one or more host access units 220a, one or more memory access units 230a and a processor 240a. In some exemplary embodiments, the processor 240a may include a host access manager 250a, a memory access manager 260a and a buffer allocator 270a.

The buffer memory 210a may include a plurality of memory buffers MB1 through MB8. FIG. 3 illustrates an example where the buffer memory 210a includes first through eighth memory buffers MB1 through MB8. However, the number of the memory buffers MB1 through MB8 of the buffer memory 210a is not limited to the example of FIG. 3. The first through eighth memory buffers MB1 through MB8 may be divided into an external memory bank group EMBG and an internal memory bank group IMBG For example, the first through fourth memory buffers MB1 through MB4 may be grouped into the external memory bank group EMBG, and the fifth through eighth memory buffers MB5 through MB8 may be grouped into the internal memory bank group IMBG The host access units 220a may perform an access to the buffer memory 210a for a host. FIG. 3 illustrates an example where the memory controller 200a includes first and second host access units HDMA1 and HDMA2. However, the number of the host access units HDMA1 and HDMA2 is not limited to the example of FIG. 3.

The memory access units 230a may perform an access to the buffer memory 210a for a memory device. FIG. 3 illustrates an example where the memory controller 200a includes first through fourth memory access units FDMA1 through FDMA4. However, the number of the memory access units FDMA1 through FDMA4 is not limited to the example of FIG. 3.

In some exemplary embodiments, the memory controller 200a may be connected to the memory device through a plurality of channels, and the memory access units FDMA1 through FDMA4 may be allocated to different ones of the plurality of channels. For example, in a case where the memory controller 200a is connected to the memory device through first through eighth channels, and includes the first through fourth memory access units FDMA1 through FDMA4, the first memory access unit FDMA1 may perform an access for data transferred through the first and second channels, the second memory access unit FDMA2 may perform an access for data transferred through the third and fourth channels, the third memory access unit FDMA3 may perform an access for data transferred through the fifth and sixth channels, and the fourth memory access unit FDMA4 may perform an access for data transferred through the seventh and eighth channels. However, the number of the channels and the number of the memory access units FDMA1 through FDMA4 are not limited to the examples described above.

The host access manager 250a may control the host access units HDMA1 and HDMA2. Further, the host access manager 250a may manage external bank index pools EBIP1, EBIP2, EBIP3 and EBIP4 respectively corresponding to the memory banks MB1, MB2, MB3 and MB4 within the external memory bank group EMBG. For example, as illustrated in FIG. 3, the external memory bank group EMBG may include the first, second, third and fourth memory banks MB1, MB2, MB3 and MB4, and the host access manager 250a may mange a first external bank index pool EBIP1 for the first memory bank MB1, a second external bank index pool EBIP2 for the second memory bank MB2, a third external bank index pool EBIP3 for the third memory bank MB3, and a fourth external bank index pool EBIP4 for the fourth memory bank MB4. Each external bank index pool (e.g., the first external bank index pool EBIP1) may store buffer indexes of available buffers (or free buffers) of a corresponding memory bank (e.g., the first memory bank MB1).

To perform an external operation, the host access manager 250a may provide a buffer index BI3 and BI4 within the external bank index pools EBIP1 through EBIP4 to the host access units HDMA1 and HDMA2, and the host access units HDMA1 and HDMA2 may access the memory banks MB1 through MB4 within the external memory bank group EMBG based on the buffer index BI3 and BI4. Once the host access manager 250a provides the buffer index BI3 and BI4 to the host access units HDMA1 and HDMA2, the host access manager 250a may remove the provided buffer index BI3 and BI4 in the external bank index pools EBIP1 through EBIP4.

In some exemplary embodiments, to maintain a reference number of buffer indexes in each external bank index pool EBIP1 through EBIP4, as described below with reference to FIG. 4, the host access manager 250a may transfer a buffer index request BI_REQ to the buffer allocator 270a when the number of the buffer indexes stored in each external bank index pool EBIP1 through EBIP4 is less than the reference number. For example, the maximum buffer index number of each external bank index pool EBIP1 through EBIP4 may be set by registers in the memory controller 200a, and the reference number may correspond to, but not limited to, about 50% of the maximum buffer index number. Further, for example, during a time period from when a buffer index number of each external bank index pool EBIP1 through EBIP4 is less than about 50% of the maximum buffer index number, or the reference number until the buffer index number of each external bank index pool EBIP1 through EBIP4 becomes about 80% of the maximum buffer index number, the host access manager 250a may transfer the buffer index request BI_REQ to the buffer allocator 270a.

When transferring the buffer index request BI_REQ, the host access manager 250a may transfer a bank address BA1 of a buffer memory corresponding to an external bank index pool of which the number of the buffer indexes is less than the reference number. For example, when the number of the buffer indexes of the first external bank index pool EBIP1 is less than the reference number, the host access manager 250a may transfer the buffer index request BI_REQ including a bank address BA1 of the first memory bank MB1 corresponding to the first external bank index pool EBIP1. The host access manager 250a may receive a buffer index BI1 of an available buffer (or a free buffer) among buffers of the first memory bank MB1 from the buffer allocator 270a, and may add the buffer index BI1 to the first external bank index pool EBIP1.

The memory access manager 260a may control the memory access units FDMA1 through FDMA4. Further, the memory access manager 260a may manage internal bank index pools IBIP1, IBIP2, IBIP3 and IBIP4 respectively corresponding to the memory banks MB5, MB6, MB7 and MB8 within the internal memory bank group IMBG. For example, as illustrated in FIG. 3, the internal memory bank group IMBG may include the fifth, sixth, seventh and eighth memory banks MB5, MB6, MB7 and MB8, and the memory access manager 260a may mange a first internal bank index pool IBIP1 for the fifth memory bank MB5, a second internal bank index pool IBIP2 for the sixth memory bank MB6, a third internal bank index pool IBIP3 for the seventh memory bank MB7, and a fourth internal bank index pool IBIP4 for the eighth memory bank MB8. Each internal bank index pool (e.g., the first internal bank index pool IBIP1) may store buffer indexes of available buffers (or free buffers) of a corresponding memory bank (e.g., the fifth memory bank MB5).

To perform the external operation, the memory access manager 260a may receive the buffer index BI3 and BI4 from the host access manager 250a, and may provide the buffer index BI3 and BI4 to the memory access units FDMA1 through FDMA4. The memory access units FDMA1 through FDMA4 may access the memory banks MB1 through MB4 within the external memory bank group EMBG based on the buffer index BI3 and BI4 received through the memory access manager 260a from the host access manager 250a.

To perform an internal operation, the memory access manager 260a may provide a buffer index BI5 within the internal bank index pools IBIP1 through IBIP4 to the memory access units FDMA1 through FDMA4, and the memory access units FDMA1 through FDMA4 may access the memory banks MB5 through MB8 within the internal memory bank group IMBG based on the buffer index BI5. Once the memory access manager 260a provides the buffer index BI5 to the memory access units FDMA1 through FDMA4, the memory access manager 260a may remove the provided buffer index BI5 in the internal bank index pools IBIP1 through IBIP4.

In some exemplary embodiments, to maintain a reference number of buffer indexes in each internal bank index pool IBIP1 through IBIP4, as described below with reference to FIG. 4, the memory access manager 260a may transfer a buffer index request BI_REQ to the buffer allocator 270a when the number of the buffer indexes stored in each internal bank index pool IBIP1 through IBIP4 is less than the reference number. For example, the maximum buffer index number of each internal bank index pool IBIP1 through IBIP4 may be set by registers in the memory controller 200a, and the reference number may correspond to, but not limited to, about 50% of the maximum buffer index number. Further, for example, during a time period from when a buffer index number of each internal bank index pool IBIP1 through IBIP4 is less than about 50% of the maximum buffer index number, or the reference number until the buffer index number of each internal bank index pool IBIP1 through IBIP4 becomes about 80% of the maximum buffer index number, the memory access manager 260a may transfer the buffer index request BI_REQ to the buffer allocator 270a.

When transferring the buffer index request BI_REQ, the memory access manager 260a may transfer a bank address BA2 of a buffer memory corresponding to an internal bank index pool of which the number of the buffer indexes is less than the reference number. For example, when the number of the buffer indexes of the first internal bank index pool IBIP1 is less than the reference number, the memory access manager 260a may transfer the buffer index request BI_REQ including a bank address BA2 of the fifth memory bank MB5 corresponding to the first internal bank index pool IBIP1. The memory access manager 260a may receive a buffer index BI2 of an available buffer (or a free buffer) among buffers of the fifth memory bank MB5 from the buffer allocator 270a, and may add the buffer index BI2 to the first internal bank index pool IBIP1.

The buffer allocator 270a may store buffer indexes of buffers of the memory banks MB1 through MB8 of the buffer memory 210a, and may manage whether each of the buffers of the memory banks MB1 through MB8 is available (or a free buffer). Here, each buffer index may be an address of a buffer (e.g., one row of memory cells in a memory bank), or may be a value generated from a buffer address. As described below with reference to FIG. 5, the buffer allocator 270a may receive the buffer index request BI_REQ including the bank address BA1 of one of the memory buffers MB1 through MB4 within the external memory bank group EMBG from the host access manager 250a, may identify a memory bank having the bank address BA1 in response to the buffer index request BI_REQ including the bank address BA1, and may transfer the buffer index BI1 of an available buffer among buffers of the identified memory bank to the host access manager 250a. Further, as described below with reference to FIG. 5, the buffer allocator 270a may receive the buffer index request BI_REQ including the bank address BA2 of one of the memory buffers MB5 through MB8 within the internal memory bank group IMBG from the memory access manager 260a, may identify a memory bank having the bank address BA2 in response to the buffer index request BI_REQ including the bank address BA2, and may transfer the buffer index BI2 of an available buffer among buffers of the identified memory bank to the memory access manager 260a.

In the memory controller 200a according to exemplary embodiments, the external memory bank group EMBG of the buffer memory 210a may be used to perform the external operation, and the internal memory bank group IMBG of the buffer memory 210a may be used to perform the internal operation.

For example, in a case where a data write operation is performed as the external operation, the host access manager 250a may provide a buffer index BI3 of the first external bank index pool EBIP1 to the first host access unit HDMA1, and the first host access unit HDMA1 may write write data WD to a buffer BUF1 of the first memory bank MB1 within the external memory bank group EMBG based on the buffer index BI3. Further, the memory access manager 260a may receive the buffer index BI3 from the host access manager 250a, and may provide the buffer index BI3 to the third memory access unit FDMA3. The third memory access unit FDMA3 may read the write data WD from the buffer BUF1 of the first memory bank MB1 within the external memory bank group EMBG based on the buffer index BI3, and may write the write data WD to the memory device.

In another example, in a case where a data read operation is performed as the external operation, the host access manager 250a may provide a buffer index BI4 of the second external bank index pool EBIP2 to the memory access manager 260a, and the memory access manager 260a may provide the buffer index BI4 to the fourth memory access unit FDMA4. The fourth memory access unit FDMA4 may write read data RD received from the memory device to a buffer BUF2 of the second memory bank MB2 within the external memory bank group EMBG based on the buffer index BI4. Further, the host access manager 250a may provide the buffer index BI4 to the second host access unit HDMA2. The second host access unit HDMA2 may read the read data RD from the buffer BUF2 of the second memory bank MB2 within the external memory bank group EMBG based on the buffer index BI4, and may provide the read data RD to the host.

Further, for example, in a case where an internal operation copies or moves memory data MD from a first region of the memory device connected to a channel allocated to the first memory access unit FDMA1 to a second region of the memory device connected to a channel allocated to the second memory access unit FDMA2, the memory access manager 260a may provide a buffer index BI5 of the second internal bank index pool IBIP2 to the first memory access unit FDMA1, and the first memory access unit FDMA1 may write the memory data MD to a buffer BUF3 of the sixth memory bank MB6 within the internal memory bank group IMBG based on the buffer index BI5. Further, the memory access manager 260a may provide the buffer index BI5 to the second memory access unit FDMA2. The second memory access unit FDMA2 may read the memory data MD from the buffer BUF3 of the sixth memory bank MB6 within the internal memory bank group IMBG based on the buffer index BI5, and may provide the memory data MD to the memory device.

As described above, in the memory controller 200a according to exemplary embodiments, the memory banks MB1 through MB4 for the external operation and the memory banks MB5 through MB8 for the internal operation may be distinguished. Accordingly, a bank conflict in which the host and memory access units 220a and 230a access the same memory bank may be prevented, and utilization of the buffer memory 210a may be improved.

Figure 4:
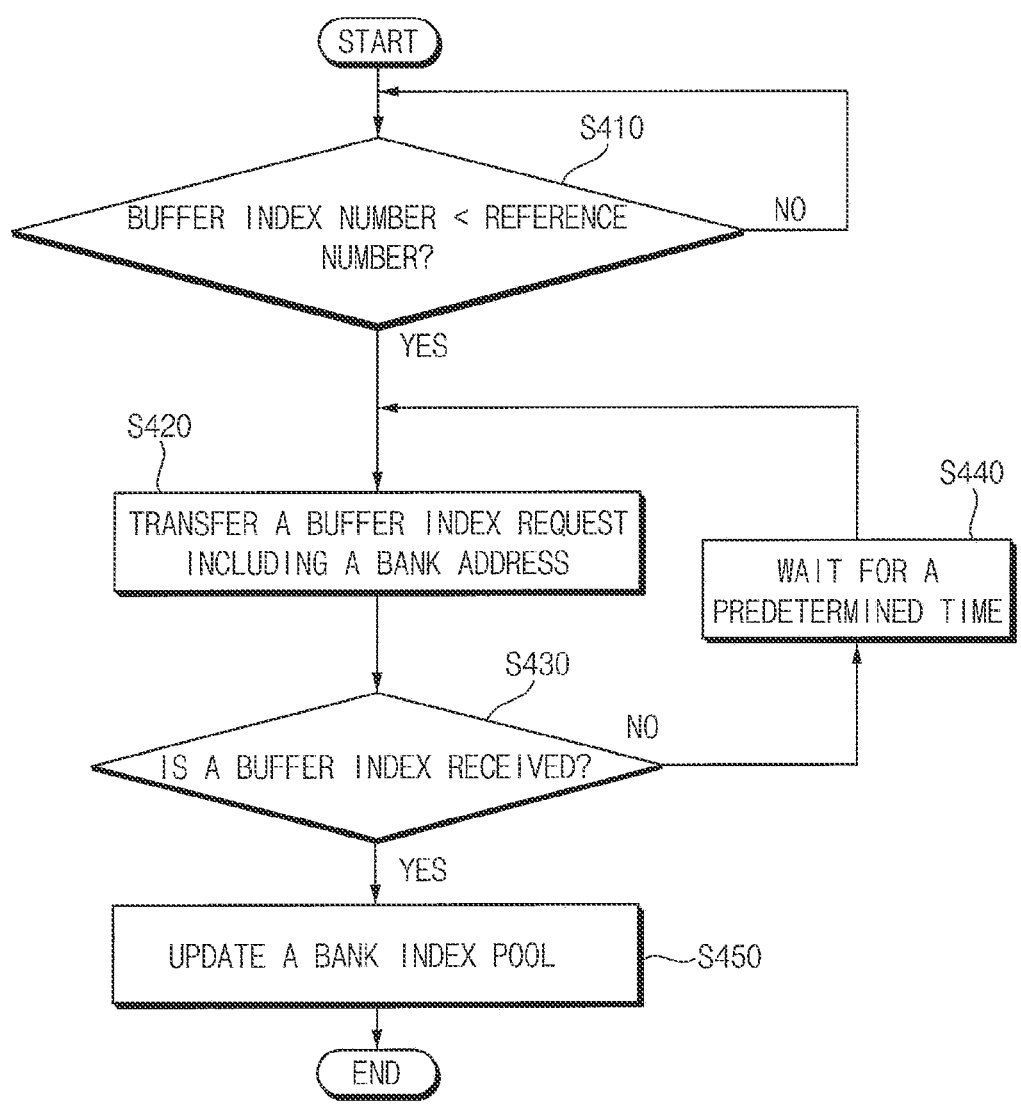
FIG. 4 is a flowchart for describing an example of a buffer index request operation of a host access manager or a memory access manager included in a memory controller.

FIG. 4 is a flowchart for describing an example of a buffer index request operation of a host access manager or a memory access manager included in a memory controller.

Referring to FIGS. 3 and 4, a host access manager 250a may compare the number of buffer indexes of each external bank index pool EBIP1 through EBIP4 with a first reference number, and a memory access manager 260a may compare the number of buffer indexes of each internal bank index pool IBIP1 through IBIP4 with a second reference number (step S410). According to exemplary embodiments, the first reference number and the second reference number may be substantially the same as each other, or may be different from each other. For example, a first maximum buffer index number of each external bank index pool EBIP1 through EBIP4 and a second maximum buffer index number of each internal bank index pool IBIP1 through IBIP4 may be set by registers in a memory controller 200a, the first reference number may correspond to, but not limited to, about 50% of the first maximum buffer index number, and the second reference number may correspond to, but not limited to, about 50% of the second maximum buffer index number. In a case where the number of the buffer indexes of each external bank index pool EBIP1 through EBIP4 is greater than or equal to the first reference number (step S410: NO), the host access manager 250a may not output a buffer index request BI_REQ. Further, in a case where the number of the buffer indexes of each internal bank index pool IBIP1 through IBIP4 is greater than or equal to the second reference number (step S410: NO), the memory access manager 260a may not output a buffer index request BI_REQ.

In a case where the number of buffer indexes of a first external bank index pool EBIP1 is less than the first reference number (step S410: YES), the host access manager 250a may transfer a buffer index request BI_REQ including a bank address BA1 of a first memory bank MB1 corresponding to the first external bank index pool EBIP1 to a buffer allocator 270a (step S420). Further, in a case where the number of buffer indexes of a first internal bank index pool IBIP1 is less than the second reference number (step S410: YES), the memory access manager 260a may transfer a buffer index request BI_REQ including a bank address BA2 of a fifth memory bank MB5 corresponding to the first internal bank index pool IBIP1 to the buffer allocator 270a (step S420).

In a case where the host access manager 250a or the memory access manager 260a does not receive a buffer index BI1 or BI2 from the buffer allocator 270a, and receive a fail response from the buffer allocator 270a (step S430: NO), the host access manager 250a or the memory access manager 260a may wait for a predetermined time (step S440), and may again transfer the buffer index request BI_REQ (step S420).

In a case where the host access manager 250a receives a buffer index BI1 from the buffer allocator 270a (step S430: YES), the host access manager 250a may update the first external bank index pool EBIP1 by adding the buffer index BI1 to the first external bank index pool EBIP1 (step S450). Further, in a case where the memory access manager 260a receives a buffer index BI2 from the buffer allocator 270a (step S430: YES), the memory access manager 260a may update the first internal bank index pool IBIP1 by adding the buffer index BI2 to the first internal bank index pool IBIP1 (step S450).

Figure 5:
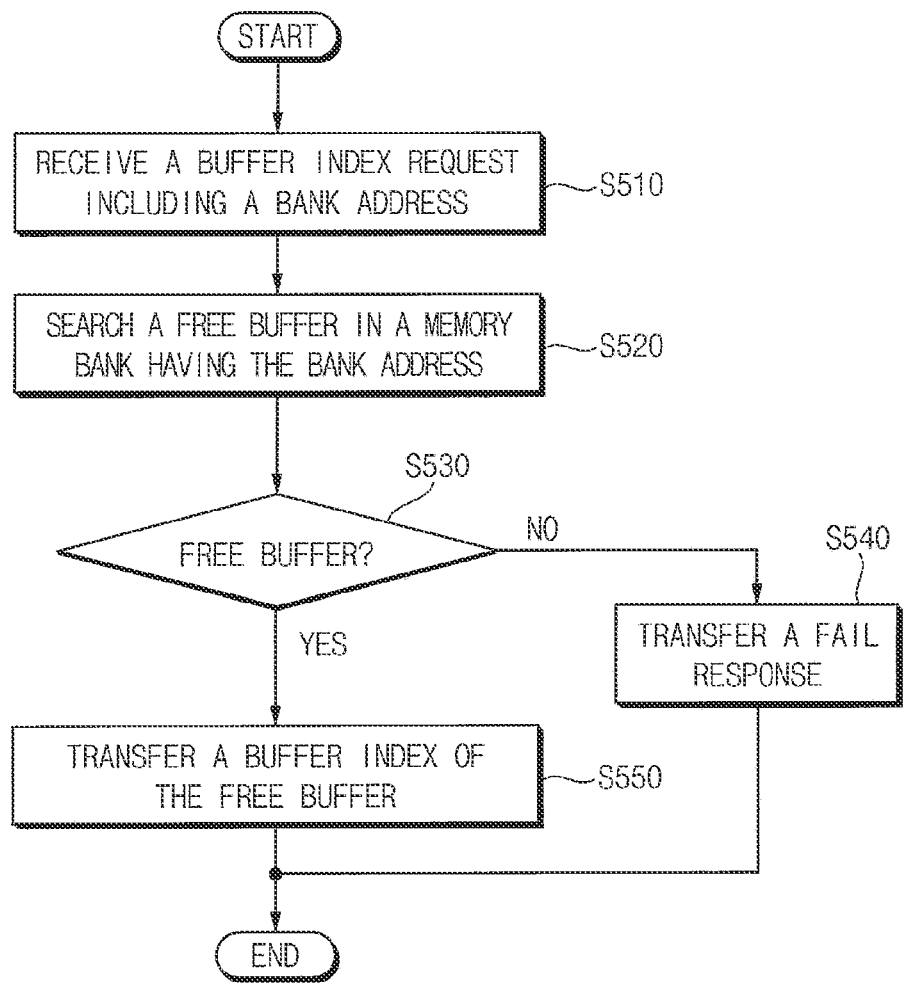
FIG. 5 is a flowchart for describing an example of an operation of a buffer allocator included in a memory controller.

FIG. 5 is a flowchart for describing an example of an operation of a buffer allocator included in a memory controller.

Referring to FIGS. 3 and 5, a buffer allocator 270a may receive a buffer index request BI_REQ including a bank address BA1 or BA2 from a host access manager 250a or a memory access manager 260a (step S510).

The buffer allocator may identify a memory bank having the bank address BA1 or BA2 of the buffer index request BI_REQ, and may search an available buffer or a free buffer among buffers of the identified memory bank (step S520). If no free buffer exists in the identified memory bank (step S530: NO), the buffer allocator 270a may transfer a fail response to the host access manager 250a or the memory access manager 260a (step S540).

If the free buffer exists in the identified memory bank (step S530: YES), the buffer allocator 270a may transfer a buffer index BI1 or BI2 of the free buffer to the host access manager 250a or the memory access manager 260a (step S550).

Figure 6:
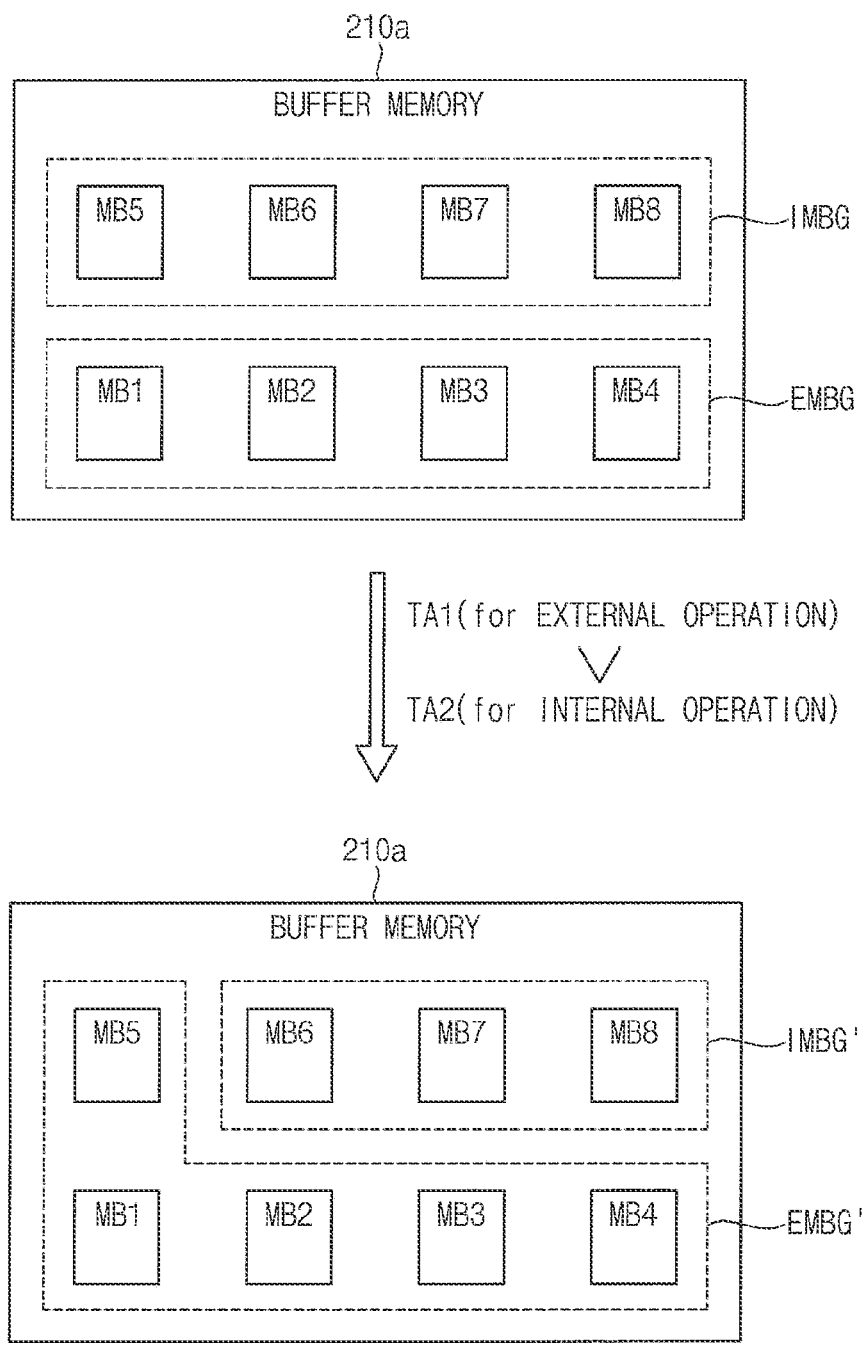
FIG. 6 is a diagram for describing an example where a memory controller changes external and internal memory bank groups according to traffic amounts of internal and external operations according to exemplary embodiments.

FIG. 6 is a diagram for describing an example where a memory controller changes external and internal memory bank groups according to traffic amounts of internal and external operations according to exemplary embodiments.

Referring to FIGS. 3 and 6, a processor 240a may group first through fourth memory banks MB1 through MB4 of a buffer memory 210a into an external memory bank group EMBG for an external operation, and may group fifth through eighth memory banks MB5 through MB8 into an internal memory bank group IMBG for an internal operation.

In some exemplary embodiments, the processor 240a may dynamically set the external memory bank group EMBG and the internal memory bank group IMBG The processor 240a may compare a first traffic amount TA1 of the external operation and a second traffic amount TA2 of the internal operation. When a difference between the first traffic amount TA1 and the second traffic amount TA2 is greater than or equal to a reference traffic amount, the processor 240a may increase the number of the memory banks included in a first one of the external memory bank group EMBG and the internal memory bank group IMBG, and may decrease the number of the memory banks included in a second one of the external memory bank group EMBG and the internal memory bank group IMBG.

For example, in a case where the first traffic amount TA1 of the external operation is greater, by more than the reference traffic amount, than the second traffic amount TA2 of the internal operation, the processor 240a may change one memory bank MB5 from the internal memory bank group IMBG to the external memory bank group EMBG such that the external memory bank group EMBG' may have five memory banks MB1 through MB5 and the internal memory bank group IMBG' may have three memory banks MB6 through MB8.

Figure 7:
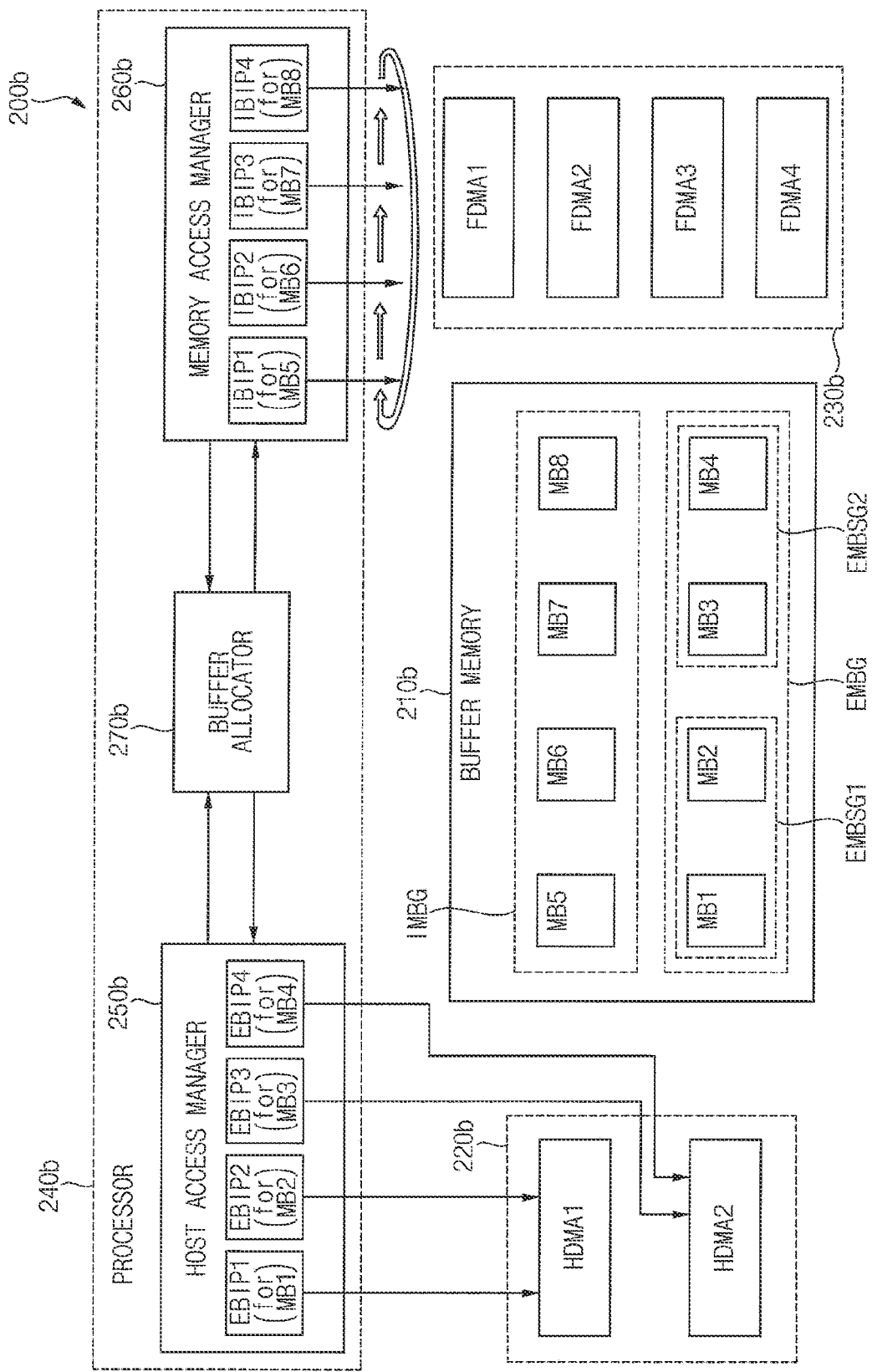
FIG. 7 is a block diagram illustrating a memory controller according to exemplary embodiments.
Figure 8:
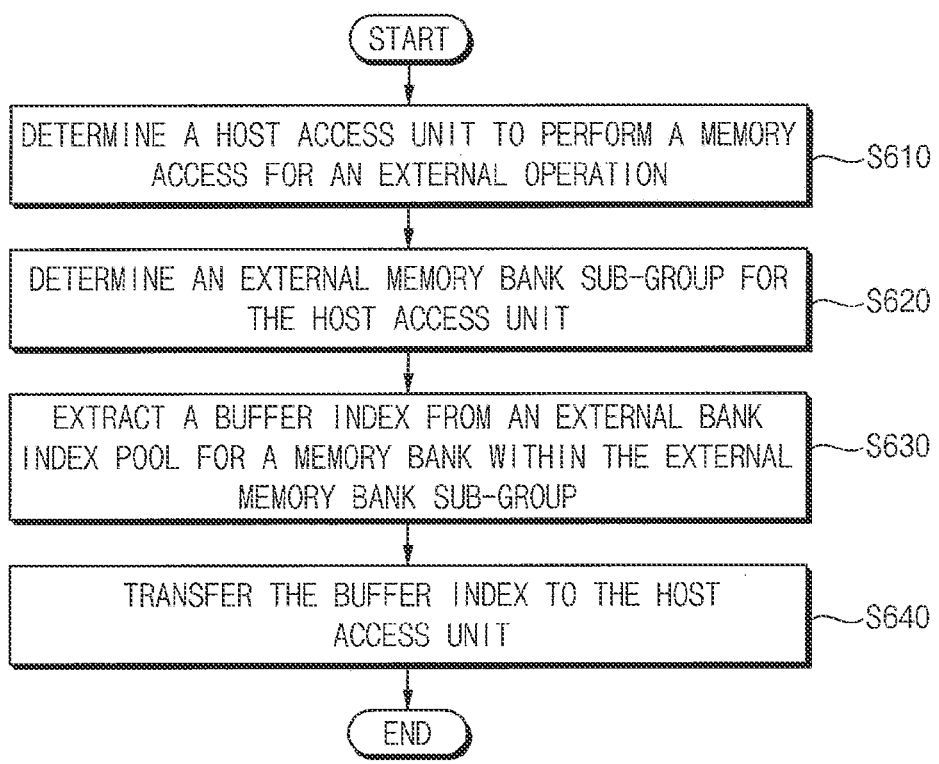
FIG. 8 is a flowchart for describing an example of a buffer index assignment operation of a host access manager included in a memory controller.
Figure 9:
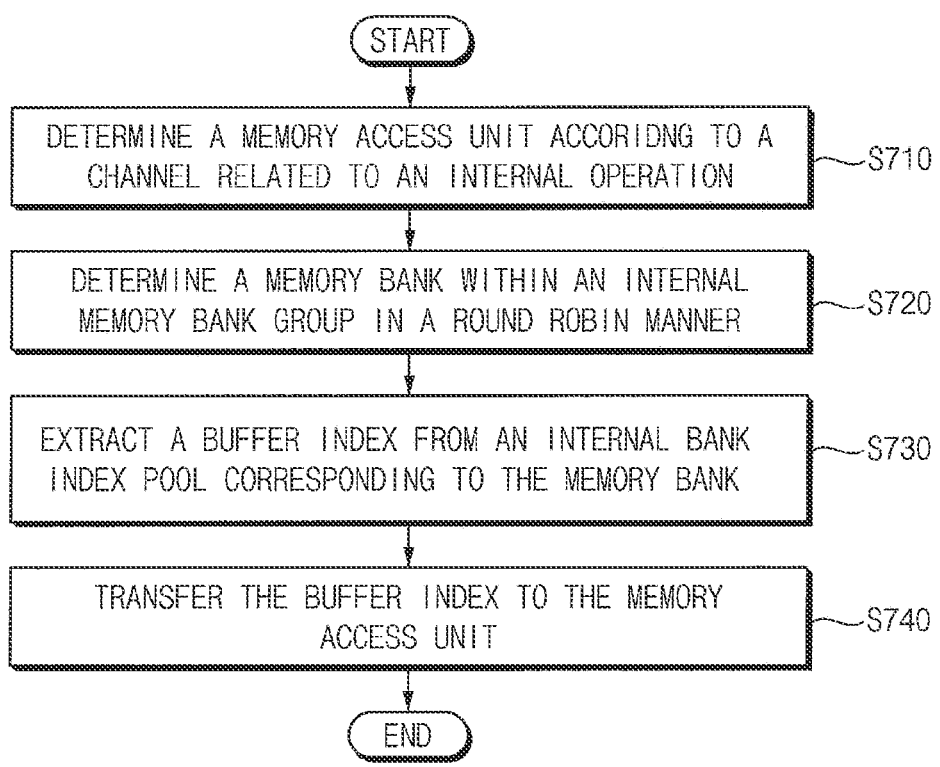
FIG. 9 is a flowchart for describing an example of a buffer index assignment operation of a memory access manager included in a memory controller.
Figure 10:
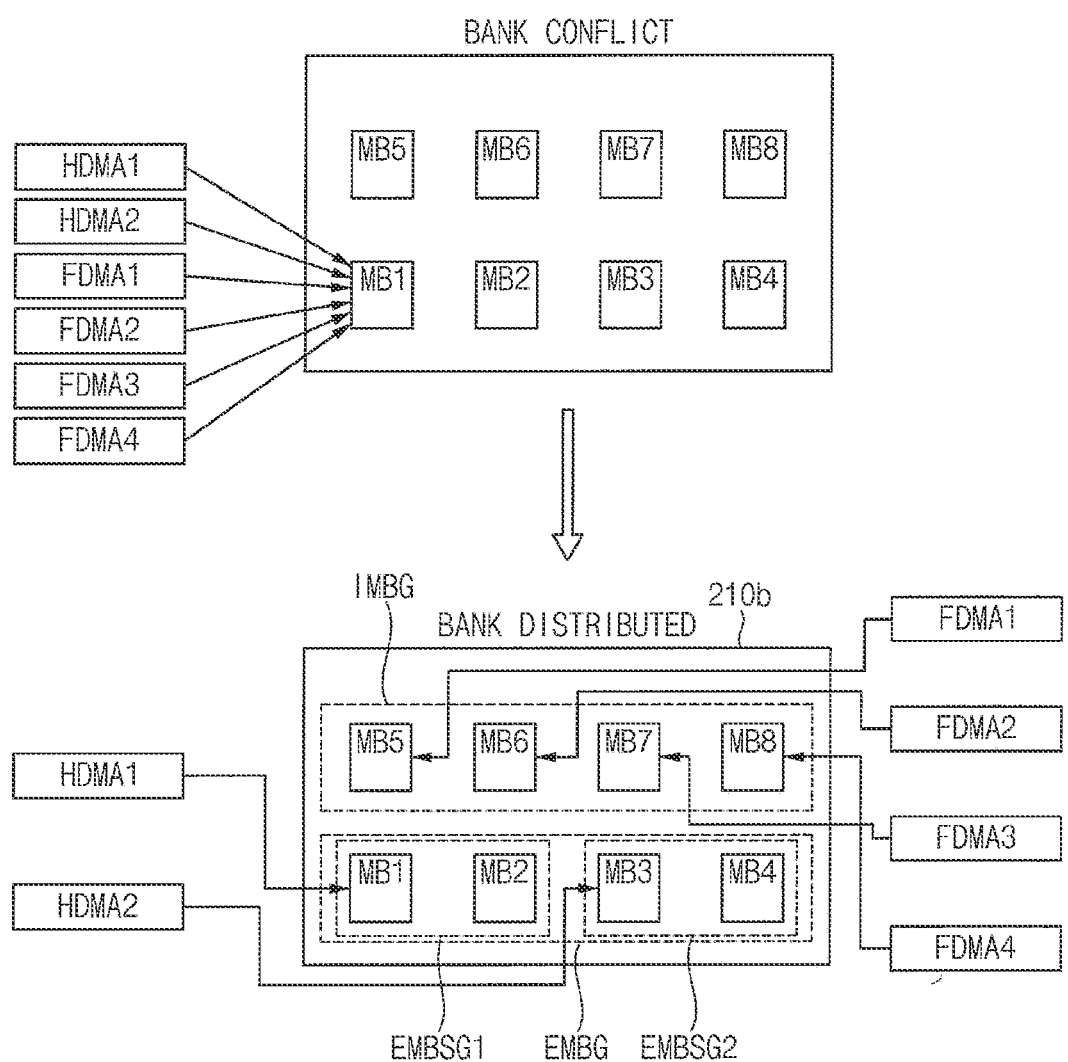
FIG. 10 is a diagram for describing an example of a memory bank allocation operation for a buffer memory by a memory controller illustrated in FIG. 7.

FIG. 7 is a block diagram illustrating a memory controller according to exemplary embodiments, FIG. 8 is a flowchart for describing an example of a buffer index assignment operation of a host access manager included in a memory controller, FIG. 9 is a flowchart for describing an example of a buffer index assignment operation of a memory access manager included in a memory controller, and FIG. 10 is a diagram for describing an example of a memory bank allocation operation for a buffer memory by the memory controller illustrated in FIG. 7.

Referring to FIG. 7, a memory controller 200b may include a buffer memory 210b, one or more host access units 220b, one or more memory access units 230b and a processor 240b. The processor 240b may include a host access manager 250b, a memory access manager 260b and a buffer allocator 270b. The memory controller 200b of FIG. 7 may have a similar configuration and a similar operation to a memory controller 200a of FIG. 3, except that an external memory bank group EMBG may be further divided into external memory bank sub-groups EMBSG1 and EMBSG2 respectively corresponding to host access units HDMA1 and HDMA2.

The processor 240b may divide the external memory bank group EMBG for an external operation into a first external memory bank sub-group EMBSG1 for a first host access unit HDMA1 and a second external memory bank sub-group EMBSG2 for a second host access unit HDMA2. The first host access unit HDMA1 may access at least one memory bank MB1 and MB2 within the first external memory bank sub-group EMBSG1, and the second host access unit HDMA2 may access at least one memory bank MB3 and MB4 within the second external memory bank sub-group EMBSG2.

For each host access unit to access a corresponding external memory bank sub-group, the host access manager 250b may assign a corresponding buffer index to each host access unit. For example, as illustrated in FIG. 8, if a command requesting an external operation is received from a host, the host access manager 250b may determine a host access unit HDMA1 or HDMA2 that is to perform an access to the buffer memory 210b (step S610). For example, the host access manager 250b may alternately select the first and second host access units HDMA1 and HDMA2. In a case where the first host access unit HDMA1 is selected as the host access unit that is to perform a memory access for the external operation, the host access manager 250b may determine the first external memory bank sub-group EMBSG1 corresponding to the first host access unit HDMA1 (step S620). In this case, the host access manager 250b may extract a buffer index from first and second external bank index pools EBIP1 and EBIP2 for first and second memory banks MB1 and MB2 within the first external memory bank sub-group EMBSG1 (step S630), and may transfer the buffer index to the first host access unit HDMA1 (step S640). Thus, the first host access unit HDMA1 may access the first and second memory banks MB1 and MB2 within the first external memory bank sub-group EMBSG1 based on the buffer index.

In some exemplary embodiments, to perform an internal operation, memory banks MB5, MB6, MB7 and MB8 within an internal memory bank group IMBG may be used sequentially or in a round robin manner. For example, to perform the internal operation, the memory access manager 260b may select one of internal bank index pools IBIP1, IBIP2, IBIP3 and IBIP4 respectively corresponding to the memory banks MB5, MB6, MB7 and MB8 within the internal memory bank group IMBG in the round robin manner, and may transfer a buffer index within the selected one of the internal bank index pools IBIP1, IBIP2, IBIP3 and IBIP4 to the memory access units 230b.

For example, as illustrated in FIG. 9, when the internal operation is performed, a memory access unit may be determined according to a channel related to the internal operation (step S710). In an example, in a case where an internal operation that stores memory data received through a channel allocated to a first memory access unit FDMA1 in the buffer memory 210b is performed, the first memory access unit FDMA1 may be determined as the memory access unit that is to perform a memory access for the internal operation. The memory access manager 260b may select a memory bank to be used for the internal operation from the internal memory bank group IMBG in the round robin manner (step S720), and may extract a buffer index from an internal bank index pool corresponding to the selected memory bank (step S730). The memory access manager 260b may transfer the extracted buffer index to the first memory access unit FDMA1 (step S740), and the first memory access unit FDMA1 may access the selected memory bank within the internal memory bank group IMBG based on the buffer index.

In a conventional memory system, as illustrated in FIG. 10, a bank conflict in which host access units HDMA1 and HDMA2 and memory access units FDMA1, FDMA2, FDMA3 and FDMA4 access the same memory bank of a buffer memory may occur. However, in the memory controller 200b according to exemplary embodiments, the memory banks MB1 through MB8 may be divided into the external memory bank group EMBG and the internal memory bank group IMBG, and thus the host access units HDMA1 and HDMA2 performing the external operation and the memory access units FDMA1, FDMA2, FDMA3 and FDMA4 performing the internal operation may access different memory banks. Further, the external memory bank group EMBG may be further divided into the external memory bank sub-groups EMBSG1 and EMBSG2, and thus the first and second host access units HDMA1 and HDMA2 may access different memory banks. In addition, the memory access manager 260b may select the memory banks MB5, MB6, MB7 and MB8 within the internal memory bank group IMBG in the round robin manner, and thus the memory access units FDMA1, FDMA2, FDMA3 and FDMA4 performing the internal operation may access different memory banks. Accordingly, the bank conflict may be prevented or reduced, and utilization of the buffer memory 210b may be improved.

Figure 11:
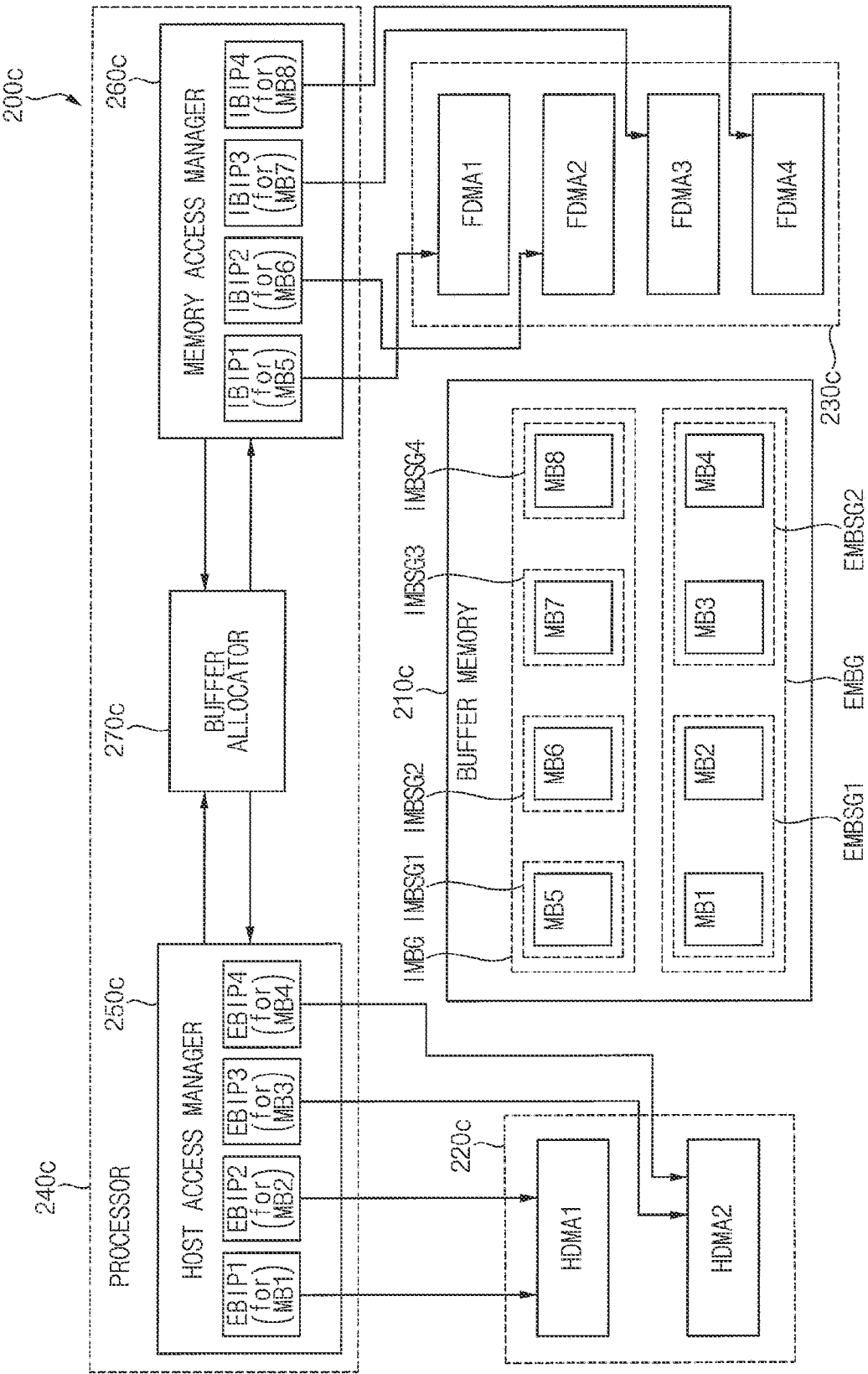
FIG. 11 is a block diagram illustrating a memory controller according to exemplary embodiments.

FIG. 11 is a block diagram illustrating a memory controller according to exemplary embodiments.

Referring to FIG. 11, a memory controller 200c may include a buffer memory 210c, one or more host access units 220c, one or more memory access units 230c and a processor 240c. The processor 240c may include a host access manager 250c, a memory access manager 260c and a buffer allocator 270c. The memory controller 200c of FIG. 11 may have a similar configuration and a similar operation to a memory controller 200b of FIG. 7, except that an internal memory bank group IMBG may be further divided into internal memory bank sub-groups respectively IMBSG1, IMBSG2, IMBSG3 and IMBSG4 corresponding to memory access units FDMA1, FDMA2, FDMA3 and FDMA4.

The processor 240c may divide the internal memory bank group IMBG for an internal operation into a first internal memory bank sub-group IMBSG1 for a first memory access unit FDMA1, a second internal memory bank sub-group IMBSG2 for a second memory access unit FDMA2, a third internal memory bank sub-group IMBSG3 for a third memory access unit FDMA3 and a fourth internal memory bank sub-group IMBSG4 for a fourth memory access unit FDMA4. In a case where the first memory access unit FDMA1 performs a memory access for the internal operation, the memory access manager 260c may provide a buffer index of a first internal bank index pool IBIP1 to the first memory access unit FDMA1, and the first memory access unit FDMA1 may access a fifth memory bank MB5 of the first internal memory bank sub-group IMBSG1 based on the buffer index. In a case where the second memory access unit FDMA2 performs a memory access for the internal operation, the memory access manager 260c may provide a buffer index of a second internal bank index pool IBIP2 to the second memory access unit FDMA2, and the second memory access unit FDMA2 may access a sixth memory bank MB6 of the second internal memory bank sub-group IMBSG2 based on the buffer index. In a case where the third memory access unit FDMA3 performs a memory access for the internal operation, the memory access manager 260c may provide a buffer index of a third internal bank index pool IBIP3 to the third memory access unit FDMA3, and the third memory access unit FDMA3 may access a seventh memory bank MB7 of the third internal memory bank sub-group IMBSG3 based on the buffer index. In a case where the fourth memory access unit FDMA4 performs a memory access for the internal operation, the memory access manager 260c may provide a buffer index of a fourth internal bank index pool IBIP4 to the fourth memory access unit FDMA4, and the fourth memory access unit FDMA4 may access an eighth memory bank MB8 of the fourth internal memory bank sub-group IMBSG4 based on the buffer index.

Figure 12:
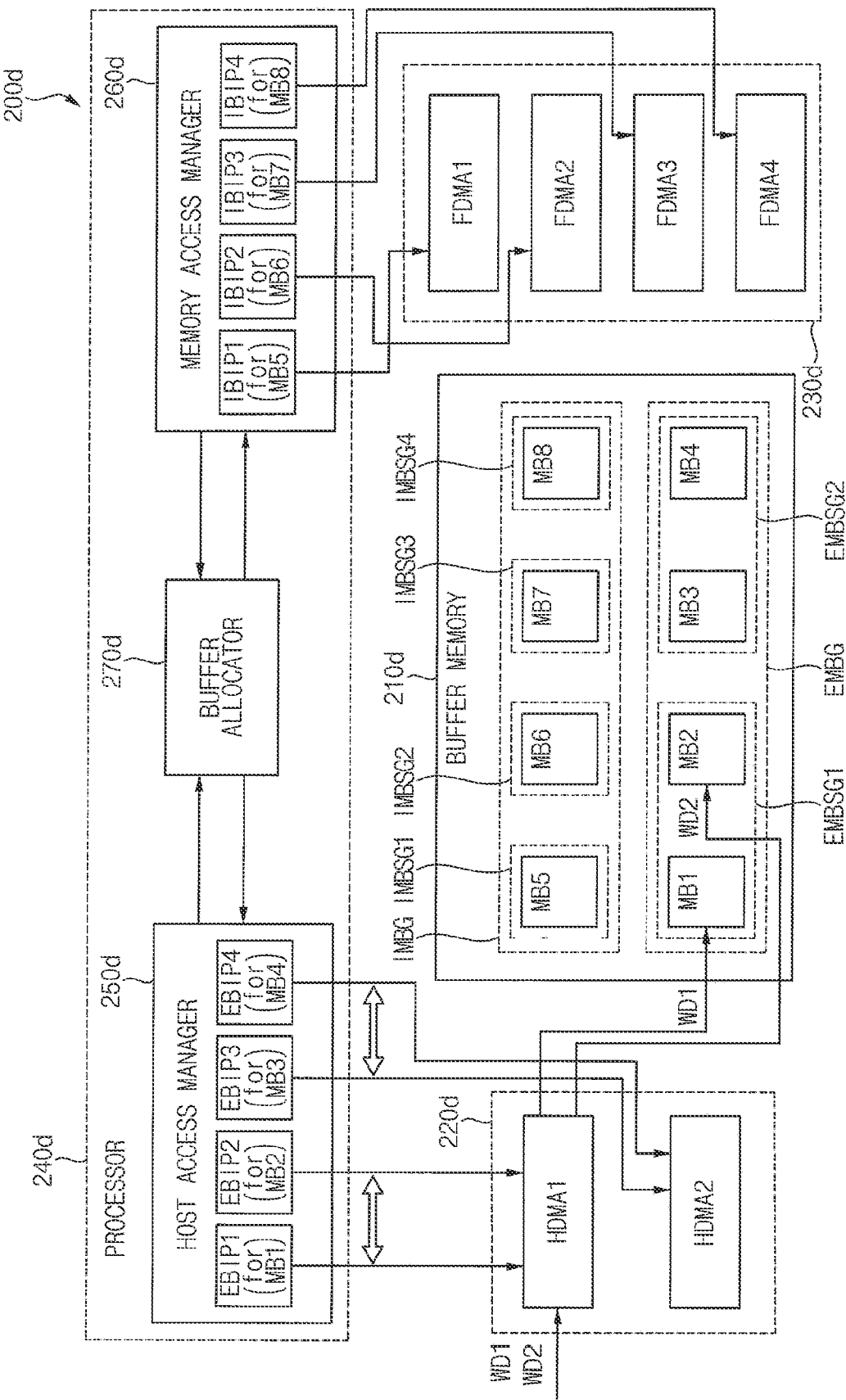
FIG. 12 is a block diagram illustrating a memory controller according to exemplary embodiments.

FIG. 12 is a block diagram illustrating a memory controller according to exemplary embodiments.

Referring to FIG. 12, a memory controller 200d may include a buffer memory 210d, one or more host access units 220d, one or more memory access units 230d and a processor 240d. The processor 240d may include a host access manager 250d, a memory access manager 260d and a buffer allocator 270d. The memory controller 200d of FIG. 12 may have a similar configuration and a similar operation to a memory controller 200c of FIG. 11, except that each host access unit (e.g., a first host access unit HDMA1) may alternately access memory banks (e.g., first and second memory banks MB1 and MB2) within a corresponding external memory bank sub-group (e.g., a first external memory bank sub-group EMBSG1).

The first host access unit HDMA1 may alternately access the first and second memory banks MB1 and MB2 within the first external memory bank sub-group EMBSG1. For example, in a case where a first host command that requests writing first write data WD1 and a second host command that requests writing second write data WD2 are sequentially received, the first host access unit HDMA1 may write the first write data WD1 to the first memory bank MB1 within the first external memory bank sub-group EMBSG1, and then may write the second write data WD2 to the second memory bank MB2 within the first external memory bank sub-group EMBSG1. Thereafter, if next write data are received, the first host access unit HDMA1 may again access the first memory bank MB1.

Figure 13:
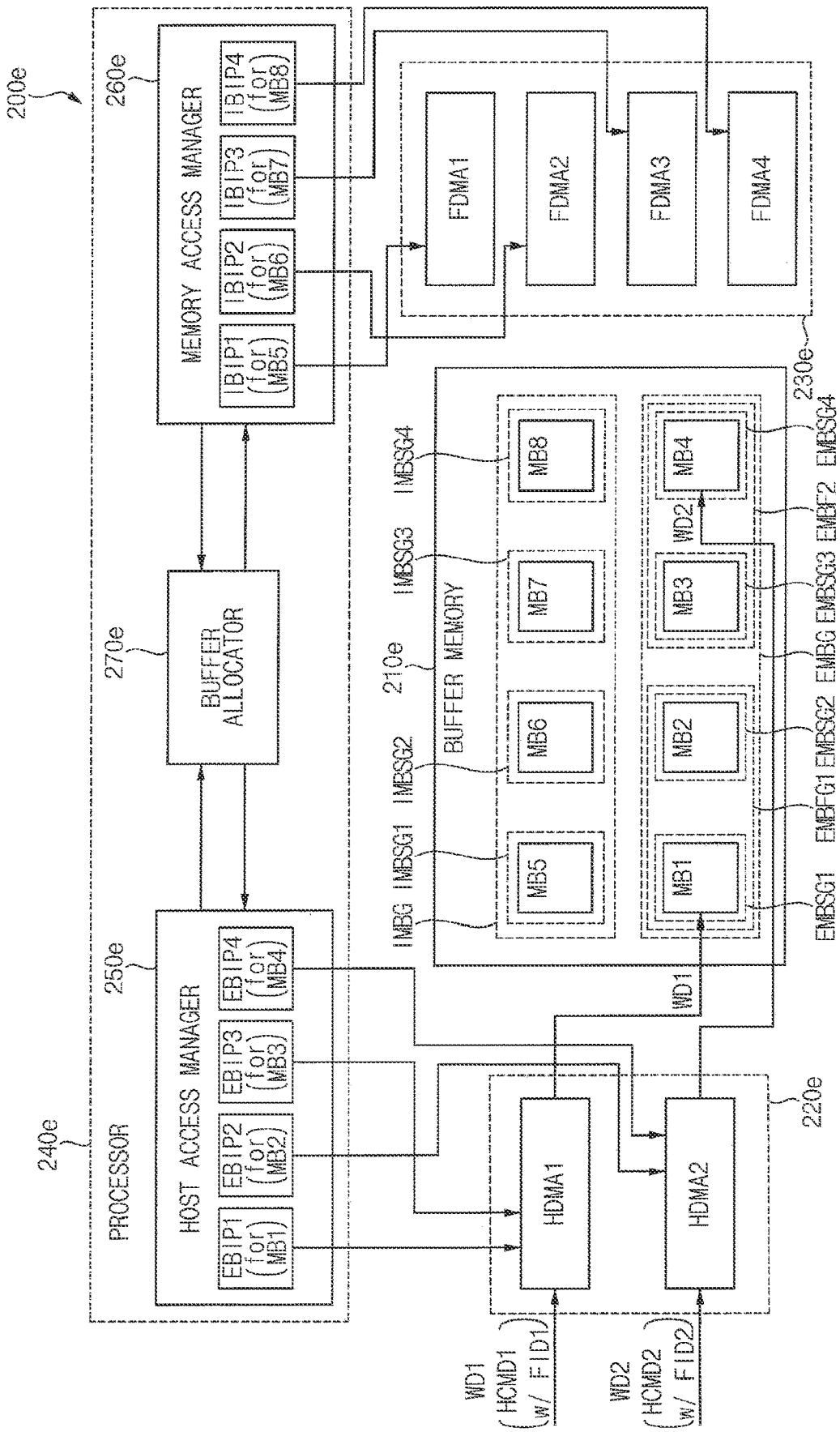
FIG. 13 is a block diagram illustrating a memory controller according to exemplary embodiments.

FIG. 13 is a block diagram illustrating a memory controller according to exemplary embodiments.

Referring to FIG. 13, a memory controller 200e may include a buffer memory 210e, one or more host access units 220e, one or more memory access units 230e and a processor 240e. The processor 240e may include a host access manager 250e, a memory access manager 260e and a buffer allocator 270e. The memory controller 200e of FIG. 13 may have a similar configuration and a similar operation to a memory controller 200c of FIG. 11, except that an external memory bank group EMBG may be further divided into a plurality of external memory bank function groups EMBF1 and EMBF2 respectively corresponding to a plurality of function identifiers FID1 and FID2.

A memory system including the memory controller 200e may provide storage spaces respectively corresponding to the plurality of function identifiers FID1 and FID2 to support a multi-function, or to support virtualization of the memory system. In this case, the memory controller 200e may receive a host command including one function identifier of the plurality of function identifiers FID1 and FID2 from a host. In response to the host command, host access units HDMA1 and HDMA2 may access one of the plurality of external memory bank function groups EMBF1 and EMBF2 corresponding to the one function identifier of the host command.

In some exemplary embodiments, each external memory bank function group EMBF1 and EMBF2 may be further divided into a plurality of external memory bank sub-groups EMBSG1, EMBSG2, EMBSG3 and EMBSG4 respectively corresponding to the host access units HDMA1 and HDMA2. For example, a first external memory bank function group EMBF1 corresponding to a first function identifier FID1 may be divided into a first external memory bank sub-group EMBSG1 corresponding to a first host access unit HDMA1 and a second external memory bank sub-group EMBSG2 corresponding to a second host access unit HDMA2, and a second external memory bank function group EMBF2 corresponding to a second function identifier FID2 may be divided into a third external memory bank sub-group EMBSG3 corresponding to the first host access unit HDMA1 and a fourth external memory bank sub-group EMBSG4 corresponding to the second host access unit HDMA2.

For example, in a case where a first host command HCMD1 that requests writing first write data WD1 has the first function identifier FID1, the first host access unit HDMA1 may write the first write data WD1 to a first memory bank MB1 of the first external memory bank sub-group EMBSG1 corresponding to the first host access unit HDMA1 within the first external memory bank function group EMBF1 corresponding to the first function identifier FID1. Further, in a case where a second host command HCMD2 that requests writing second write data WD2 has the second function identifier FID2, the second host access unit HDMA2 may write the second write data WD2 to a fourth memory bank MB4 of the fourth external memory bank sub-group EMBSG4 corresponding to the second host access unit HDMA2 within the second external memory bank function group EMBF2 corresponding to the second function identifier FID2.

Figure 14:
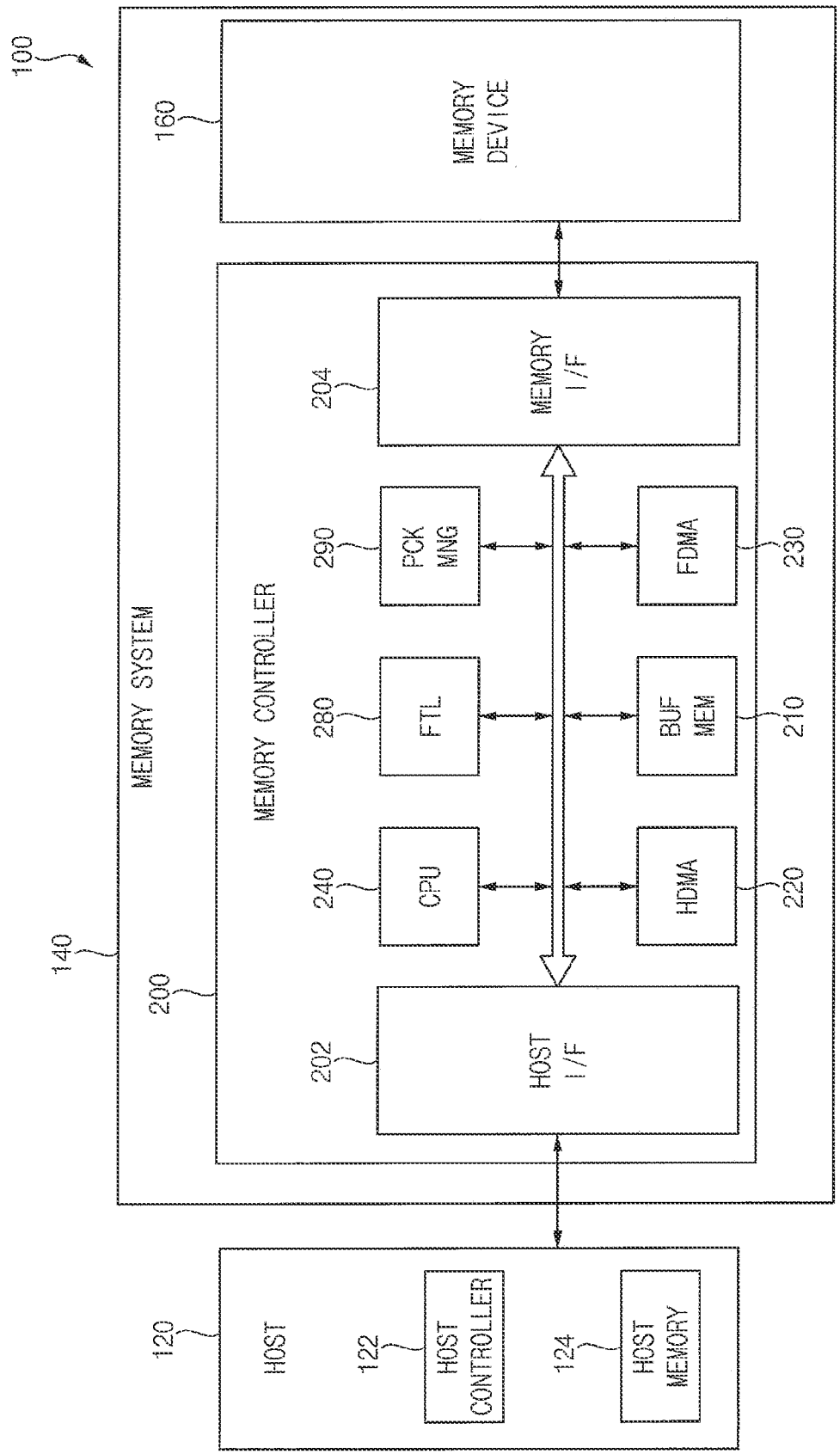
FIG. 14 is a block diagram illustrating an electronic system according to exemplary embodiments.

FIG. 14 is a block diagram illustrating an electronic system according to exemplary embodiments.

Referring to FIG. 14, an electronic system 100 may include a host 120 and a memory system 140. The memory system 140 may include a memory controller 200 and a memory device 160. In some exemplary embodiments, the memory device 160 may be a nonvolatile memory device (NVM). Further, according to exemplary embodiments, the host 120 may include a host controller 122 and a host memory 124. The host memory 124 may serve as a buffer memory configured to temporarily store data to be transmitted to the memory system 140 or data received from the memory system 140.

When the memory device 160 of the memory system 140 includes a flash memory, the flash memory may include a 2D NAND memory array or a 3D (or vertical) NAND (VNAND) memory array. As another example, the memory system 140 may include various other kinds of NVMs. For example, the memory system 140 may include an MRAM, a spin-transfer torque MRAM, a conductive bridging RAM (CBRAM), an FRAM, PRAM, RRAM, and various other kinds of memories.

According to an exemplary embodiment, the host controller 122 and the host memory 124 may be implemented as separate semiconductor chips. Alternatively, in some exemplary embodiments, the host controller 122 and the host memory 124 may be integrated in the same semiconductor chip. As an example, the host controller 122 may be any one of a plurality of modules included in an application processor (AP). The AP may be implemented as a System on Chip (SoC). Further, the host memory 124 may be an embedded memory included in the AP or an NVM or memory module located outside the AP.

The host controller 122 may manage an operation of storing data (e.g., write data) of a buffer region of the host memory 124 in the memory device 160 or an operation of storing data (e.g., read data) of the memory device 160 in the buffer region.

The memory controller 200 may include a host interface 202, a memory interface 204, a buffer memory 210, a host access unit 220, a memory access unit 230 and a processor 240. In some exemplary embodiments, the processor 240 may be a CPU. The memory controller 200 may further include a flash translation layer (FTL) 280, a packet manager 290, an error correction code (ECC) engine and an advanced encryption standard (AES) engine. The memory controller 200 may further include a working memory (not shown) in which the FTL 280 is loaded, and the CPU 240 may execute the FTL 280 to control data write and read operations on a memory device.

The host interface 202 may transmit and receive packets to and from the host 120. A packet transmitted from the host 120 to the host interface 202 may include a host command or data to be written to the memory device 160. A packet transmitted from the host interface 202 to the host 120 may include a response to the host command or data read from the memory device 160. The memory interface 204 may transmit data to be written to the memory device 160 to the memory device 160, or may receive data read from the memory device 160. The memory interface 204 may be configured to comply with a standard protocol, such as Toggle or open NAND flash interface (ONFI).

The FTL 280 may perform various functions, such as an address mapping operation, a wear-leveling operation, and a garbage collection operation. The address mapping operation may be an operation of converting a logical address received from the host 120 into a physical address used to actually store data in the memory device 160. The wear-leveling operation may be a technique for preventing excessive deterioration of a specific block by allowing blocks of the memory device 160 to be uniformly used. As an example, the wear-leveling operation may be implemented using a firmware technique that balances erase counts of physical blocks. The garbage collection operation may be a technique for ensuring usable capacity in the memory device 160 by erasing an existing block after copying valid data of the existing block to a new block.

The packet manager 290 may generate a packet according to a protocol of an interface, which consents to the host 120, or parse various types of information from the packet received from the host 120. In addition, the buffer memory 210 may temporarily store data to be written to the memory device 160 or data to be read from the memory device 160. Although the buffer memory 210 may be a component included in the memory controller 200, the buffer memory 210 may be external of the memory controller 200.

The ECC engine may perform error detection and correction operations on read data read from the memory device 160. More specifically, the ECC engine may generate parity bits for write data to be written to the memory device 160, and the generated parity bits may be stored in the memory device 160 together with write data. During the reading of data from the memory device 160, the ECC engine may correct an error in the read data by using the parity bits read from the memory device 160 along with the read data, and output error-corrected read data.

The AES engine may perform at least one of an encryption operation and a decryption operation on data input to the memory controller 200 by using a symmetric-key algorithm.

Figure 15:
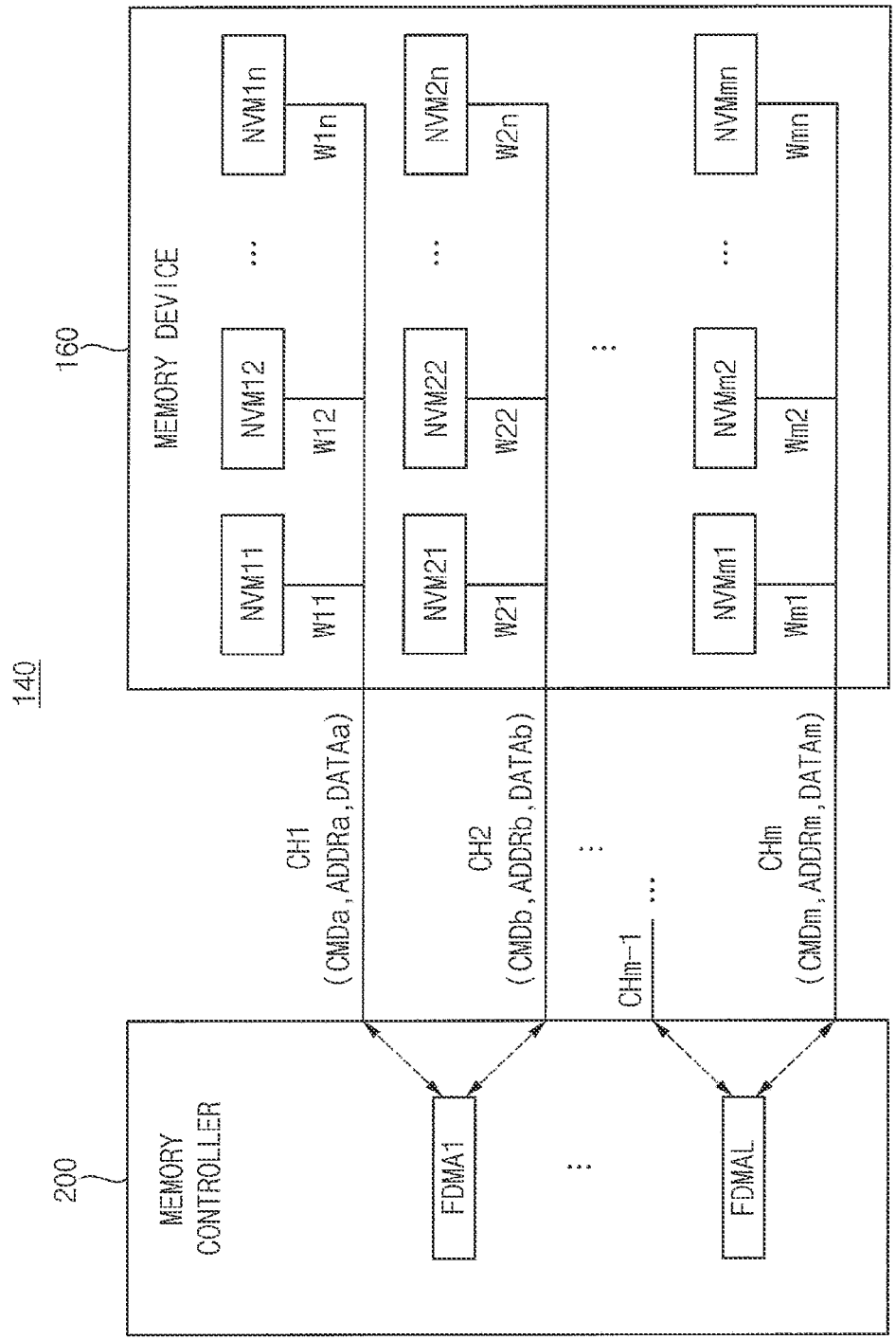
FIG. 15 is a block diagram illustrating a memory system according to exemplary embodiments.

FIG. 15 is a block diagram illustrating a memory system according to exemplary embodiments.

Referring to FIG. 15, a memory system 140 may include a memory controller 200 and a memory device 160. The memory system 140 may support a plurality of channels CH1 to CHm, and the memory device 160 may be connected to the memory controller 200 through the plurality of channels CH1 to CHm. For example, the memory system 140 may be implemented as a storage device, such as an SSD.

The memory device 160 may include a plurality of nonvolatile memory devices NVM11 to NVMmn Each of the nonvolatile memory devices NVM11 to NVMmn may be connected to one of the plurality of channels CH1 to CHm through a way corresponding thereto. For instance, the nonvolatile memory devices NVM11 to NVM1$n$ may be connected to a first channel CH1 through ways W11 to W1$n$, and the nonvolatile memory devices NVM21 to NVM2$n$ may be connected to a second channel CH2 through ways W21 to W2$n$. In an exemplary embodiment, each of the nonvolatile memory devices NVM11 to NVMmn may be implemented as an arbitrary memory unit that may operate according to an individual command from the memory controller 200. For example, each of the nonvolatile memory devices NVM11 to NVMmn may be implemented as a chip or a die, but the inventive concept is not limited thereto.

The memory controller 200 may transmit and receive signals to and from the memory device 160 through the plurality of channels CH1 to CHm. For example, the memory controller 200 may transmit commands CMDa to CMDm, addresses ADDRa to ADDRm, and data DATAa to DATAm to the memory device 160 through the channels CH1 to CHm or receive the data DATAa to DATAm from the memory device 160.

The memory controller 200 may select one of the nonvolatile memory devices NVM11 to NVMmn, which is connected to each of the channels CH1 to CHm, by using a corresponding one of the channels CH1 to CHm, and transmit and receive signals to and from the selected nonvolatile memory device. For example, the memory controller 200 may select the nonvolatile memory device NVM11 from the nonvolatile memory devices NVM11 to NVM1$n$ connected to the first channel CH1. The memory controller 200 may transmit the command CMDa, the address ADDRa, and the data DATAa to the selected nonvolatile memory device NVM11 through the first channel CH1 or receive the data DATAa from the selected nonvolatile memory device NVM11.

The memory controller 200 may transmit and receive signals to and from the memory device 160 in parallel through different channels. For example, the memory controller 200 may transmit a command CMDb to the memory device 160 through the second channel CH2 while transmitting a command CMDa to the memory device 160 through the first channel CH1. For example, the memory controller 200 may receive data DATAb from the memory device 160 through the second channel CH2 while receiving data DATAa from the memory device 160 through the first channel CH1.

The memory controller 200 may control all operations of the memory device 160. The memory controller 200 may transmit a signal to the channels CH1 to CHm and control each of the nonvolatile memory devices NVM11 to NVMmn connected to the channels CH1 to CHm. For instance, the memory controller 200 may transmit the command CMDa and the address ADDRa to the first channel CH1 and control one selected from the nonvolatile memory devices NVM11 to NVM1n.

Each of the nonvolatile memory devices NVM11 to NVMmn may operate via the control of the memory controller 200. For example, the nonvolatile memory device NVM11 may program the data DATAa based on the command CMDa, the address ADDRa, and the data DATAa provided to the first channel CH1. For example, the nonvolatile memory device NVM21 may read the data DATAb based on the command CMDb and the address ADDRb provided to the second channel CH2 and transmit the read data DATAb to the memory controller 200.

The memory controller 200 may include L memory access units FDMA1 through FDMAL, where L is an integer greater than or equal to 1, and the L memory access units FDMA1 through FDMAL may be allocated to different channels. For example, a first memory access unit FDMA1 may perform an access to a buffer memory of the memory controller 200 for data DATAa and DATAb of the first and second channels CH1 and CH2, and an L-th memory access unit FDMAL may perform an access to the buffer memory of the memory controller 200 for data DATAm of the channels CHm-1 and CHm different from the first and second channels CH1 and CH2.

Although FIG. 15 illustrates an example in which the memory device 160 communicates with the memory controller 200 through m channels and includes n nonvolatile memory devices corresponding to each of the channels, the number of channels and the number of nonvolatile memory devices connected to one channel may be variously changed. Further, although FIG. 15 illustrates an example in which the memory device 160 includes the nonvolatile memory devices NVM11 to NVMnm, the memory device 160 may include any memory device.

Figure 16:
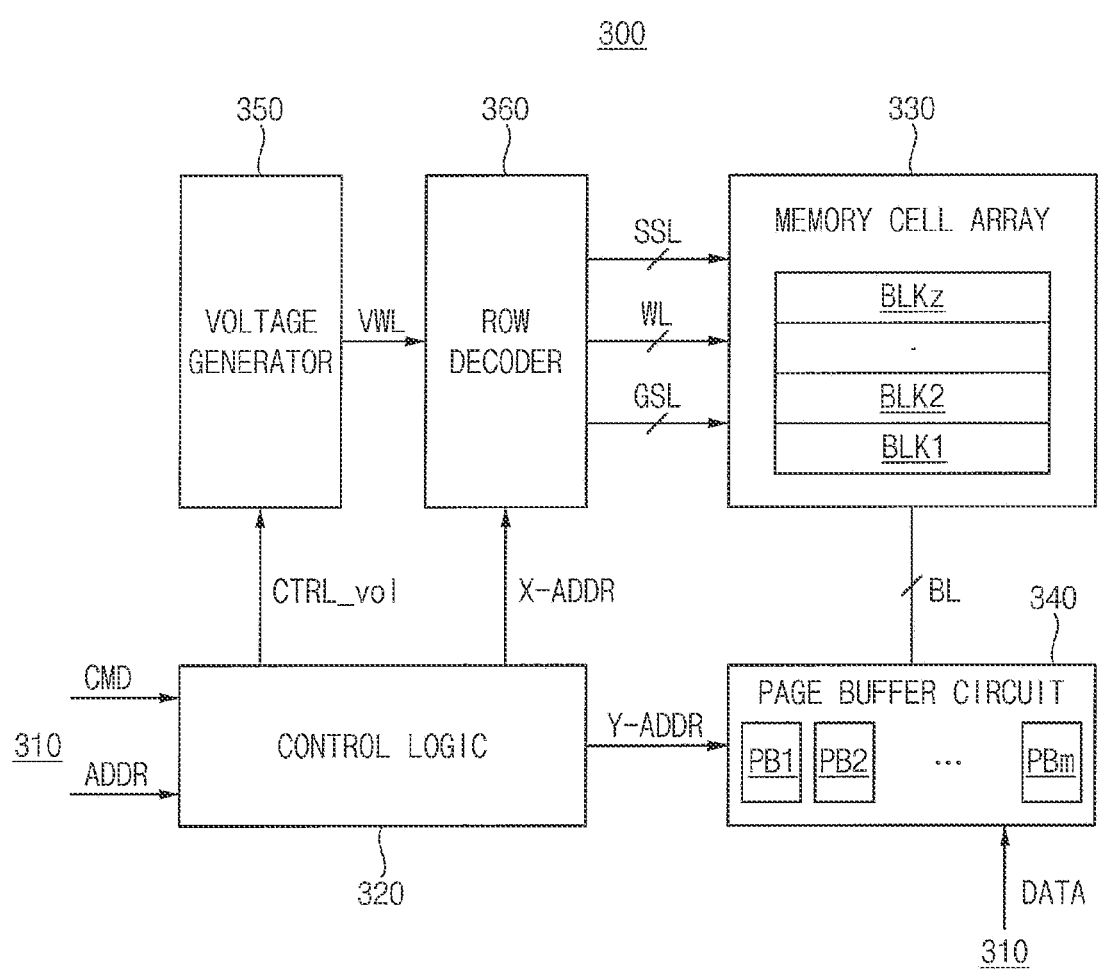
FIG. 16 is a block diagram illustrating an example of a memory device included in a memory system according to exemplary embodiments.

FIG. 16 is a block diagram illustrating an example of a memory device included in a memory system according to exemplary embodiments.

Referring to FIG. 16, a memory device 300 may include a memory cell array 330, and a control circuit that performs an operation for the memory cell array 330. The control circuit may include a control logic circuitry 320, a page buffer circuit 340, a voltage generator 350 and a row decoder 360. Although not shown in FIG. 16, the memory device 300 may further include an interface circuitry 310. In addition, the memory device 300 may further include column logic, a pre-decoder, a temperature sensor, a command decoder, and/or an address decoder.

The control logic circuitry 320 may control all various operations of the memory device 300. The control logic circuitry 320 may output various control signals in response to commands CMD and/or addresses ADDR from the interface circuitry 310. For example, the control logic circuitry 320 may output a voltage control signal CTRL_vol, a row address X-ADDR, and a column address Y-ADDR.

The memory cell array 330 may include a plurality of memory blocks BLK1 to BLKz (here, z is a positive integer), each of which may include a plurality of memory cells. The memory cell array 330 may be connected to the page buffer circuit 340 through bitlines BL and be connected to the row decoder 360 through wordlines WL, string selection lines SSL, and ground selection lines GSL.

In an exemplary embodiment, the memory cell array 330 may include a 3D memory cell array, which includes a plurality of NAND strings. Each of the NAND strings may include memory cells respectively connected to wordlines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In an exemplary embodiment, the memory cell array 330 may include a 2D memory cell array, which includes a plurality of NAND strings arranged in a row direction and a column direction.

The page buffer circuit 340 may include a plurality of page buffers PB1 to PBm (here, m is an integer greater than or equal to 3), which may be respectively connected to the memory cells through a plurality of bitlines BL. The page buffer circuit 340 may select at least one of the bitlines BL in response to the column address Y-ADDR. The page buffer circuit 340 may operate as a write driver or a sense amplifier according to an operation mode. For example, during a program operation, the page buffer circuit 340 may apply a bitline voltage corresponding to data to be programmed, to the selected bitline. During a read operation, the page buffer circuit 340 may sense current or a voltage of the selected bitline BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and an erase voltage as a wordline voltage VWL.

The row decoder 360 may select one of a plurality of wordlines WL and select one of a plurality of string selection lines SSL in response to the row address X-ADDR. For example, the row decoder 360 may apply the program voltage and the program verification voltage to the selected wordline WL during a program operation and apply the read voltage to the selected word line WL during a read operation.

Figure 17:
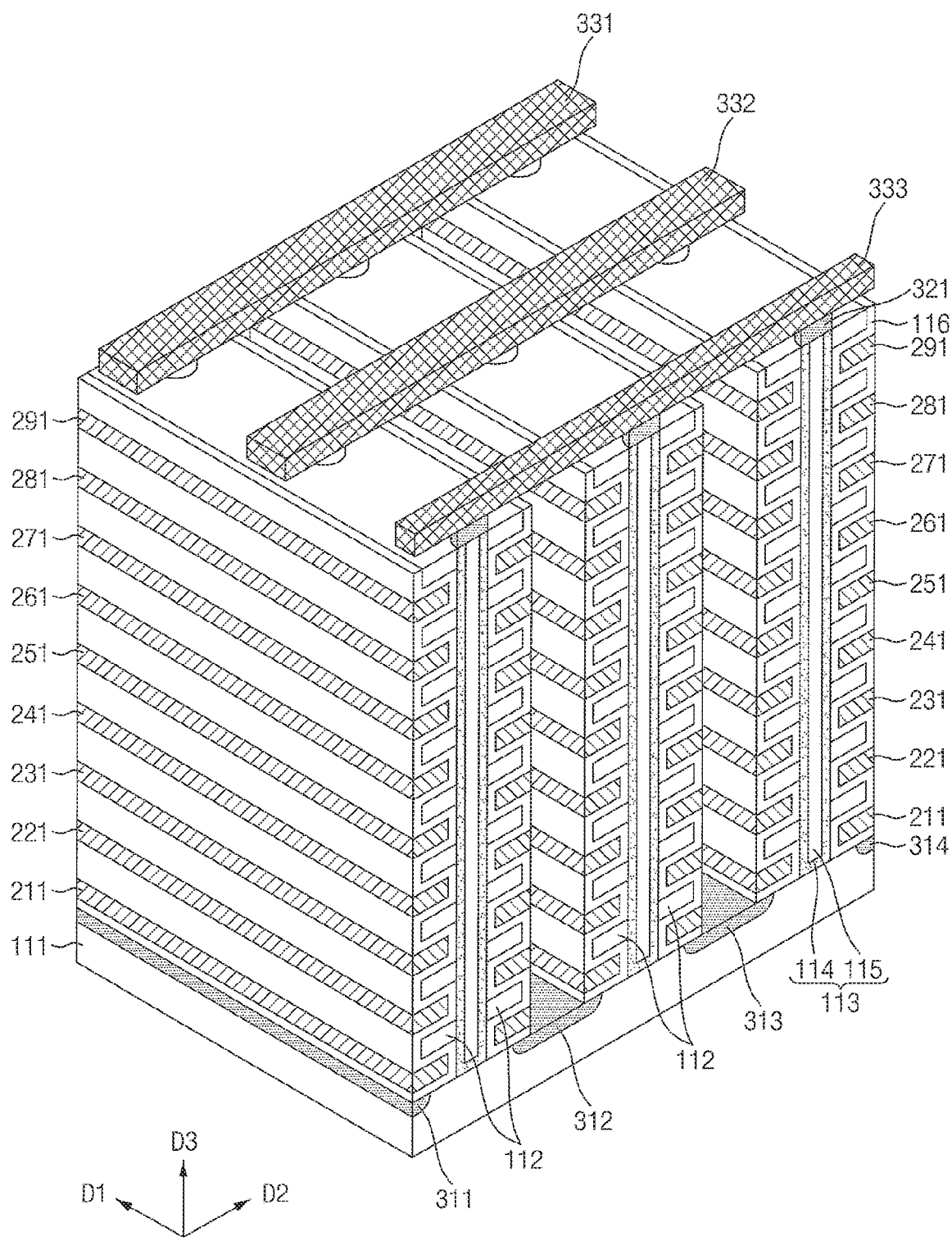
FIG. 17 is a perspective view illustrating an example of a memory block included in a memory cell array of a memory device of FIG. 16.

FIG. 17 is a perspective view illustrating an example of a memory block included in a memory cell array of the memory device of FIG. 16.

Referring to FIG. 17, a memory block BLKi includes a plurality of cell strings (e.g., a plurality of vertical NAND strings) which are formed on a substrate in a three-dimensional structure (or a vertical structure). The memory block BLKi includes structures extending along first, second and third directions D1, D2 and D3.

A substrate 111 is provided. For example, the substrate 111 may have a well of a first type of charge carrier impurity (e.g., a first conductivity type) therein. For example, the substrate 111 may have a p-well formed by implanting a group 3 element such as boron (B). In particular, the substrate 111 may have a pocket p-well provided within an n-well. In an exemplary embodiment, the substrate 111 has a p-type well (or a p-type pocket well). However, the conductivity type of the substrate 111 is not limited to p-type.

A plurality of doping regions 311, 312, 313 and 314 arranged along the second direction D2 are provided in/on the substrate 111. This plurality of doping regions 311 to 314 may have a second type of charge carrier impurity (e.g., a second conductivity type) different from the first type of the substrate 111. In one exemplary embodiment of the invention, the first to fourth doping regions 311 to 314 may have n-type. However, the conductivity type of the first to fourth doping regions 311 to 314 is not limited to n-type.

A plurality of insulation materials 112 extending along the first direction D1 are sequentially provided along the third direction D3 on a region of the substrate 111 between the first and second doping regions 311 and 312. For example, the plurality of insulation materials 112 are provided along the third direction D3, being spaced by a specific distance. For example, the insulation materials 112 may include or may be formed of an insulation material such as an oxide layer.

A plurality of pillars 113 penetrating the insulation materials along the third direction D3 are sequentially disposed along the first direction D1 on a region of the substrate 111 between the first and second doping regions 311 and 312. For example, the plurality of pillars 113 penetrates the insulation materials 112 to contact the substrate 111.

In some exemplary embodiments, each pillar 113 may include a plurality of materials. For example, a channel layer 114 of each pillar 113 may include or may be formed of a silicon material having a first conductivity type. For example, the channel layer 114 of each pillar 113 may include or may be formed of a silicon material having the same conductivity type as the substrate 111. In one exemplary embodiment of the invention, the channel layer 114 of each pillar 113 includes or is formed of p-type silicon. However, the channel layer 114 of each pillar 113 is not limited to the p-type silicon.

An internal material 115 of each pillar 113 includes an insulation material. For example, the internal material 115 of each pillar 113 may include or may be formed of an insulation material such as a silicon oxide. In some examples, the internal material 115 of each pillar 113 may include an air gap. The term "air" as discussed herein, may refer to atmospheric air, or other gases that may be present during the manufacturing process.

An insulation layer 116 is provided along the exposed surfaces of the insulation materials 112, the pillars 113, and the substrate 111, on a region between the first and second doping regions 311 and 312. For example, the insulation layer 116 provided on surfaces of the insulation material 112 may be interposed between pillars 113 and a plurality of stacked first conductive materials 211, 221, 231, 241, 251, 261, 271, 281 and 291, as illustrated. In some examples, the insulation layer 116 need not be provided between the first conductive materials 211 to 291 corresponding to ground selection lines GSL (e.g., 211) and string selection lines SSL (e.g., 291). For example, the ground selection lines GSL are the lowermost ones of the stack of first conductive materials 211 to 291 and the string selection lines SSL are the uppermost ones of the stack of first conductive materials 211 to 291.

The plurality of first conductive materials 211 to 291 are provided on surfaces of the insulation layer 116, in a region between the first and second doping regions 311 and 312. For example, the first conductive material 211 extending along the first direction D1 is provided between the insulation material 112 adjacent to the substrate 111 and the substrate 111. In more detail, the first conductive material 211 extending along the first direction D1 is provided between the insulation layer 116 at the bottom of the insulation material 112 adjacent to the substrate 111 and the substrate 111.

A first conductive material extending along the first direction D1 is provided between the insulation layer 116 at the top of the specific insulation material among the insulation materials 112 and the insulation layer 116 at the bottom of a specific insulation material among the insulation materials 112. For example, a plurality of first conductive materials 221 to 281 extending along the first direction D1 are provided between the insulation materials 112 and it may be understood that the insulation layer 116 is provided between the insulation materials 112 and the first conductive materials 221 to 281. The first conductive materials 211 to 291 may be formed of a conductive metal, but in other exemplary embodiments of the invention the first conductive materials 211 to 291 may include or may be formed of a conductive material such as a polysilicon.

The same structures as those on the first and second doping regions 311 and 312 may be provided in a region between the second and third doping regions 312 and 313. In the region between the second and third doping regions 312 and 313, a plurality of insulation materials 112 are provided, which extend along the first direction D1. A plurality of pillars 113 is provided that are disposed sequentially along the first direction D1 and penetrate the plurality of insulation materials 112 along the third direction D3. An insulation layer 116 is provided on the exposed surfaces of the plurality of insulation materials 112 and the plurality of pillars 113, and a plurality of first conductive materials 211 to 291 extend along the first direction D1. Similarly, the same structures as those on the first and second doping regions 311 and 312 may be provided in a region between the third and fourth doping regions 313 and 314.

A plurality of drain regions 321 are provided on the plurality of pillars 113, respectively. The drain regions 321 may include or may be formed of silicon materials doped with a second type of charge carrier impurity. For example, the drain regions 321 may include or may be formed of silicon materials doped with an n-type dopant. In one exemplary embodiment of the invention, the drain regions 321 include or are formed of n-type silicon materials. However, the drain regions 321 are not limited to n-type silicon materials.

On the drain regions, a plurality of second conductive materials 331, 332 and 333 are provided, which extend along the second direction D2. The second conductive materials 331 to 333 are disposed along the first direction D1, being spaced apart from each other by a specific distance. The second conductive materials 331 to 333 are respectively connected to the drain regions 321 in a corresponding region. The drain regions 321 and the second conductive material 333 extending along the second direction D2 may be connected through each contact plug. Each contact plug may be, for example, a conductive plug formed of a conductive material such as a metal. The second conductive materials 331 to 333 may include or may be formed of metal materials. The second conductive materials 331 to 333 may include or may be formed of conductive materials such as a polysilicon.

In the example of FIG. 17, the first conductive materials 211 to 291 may be used to form the wordlines WL, the string selection lines SSL and the ground selection lines GSL. For example, the first conductive materials 221 to 281 may be used to form the wordlines WL, where conductive materials belonging to the same layer may be interconnected. The second conductive materials 331 to 333 may be used to form the bitlines BL. The number of layers of the first conductive materials 211 to 291 may be changed variously according to process and control techniques.

Figure 18:
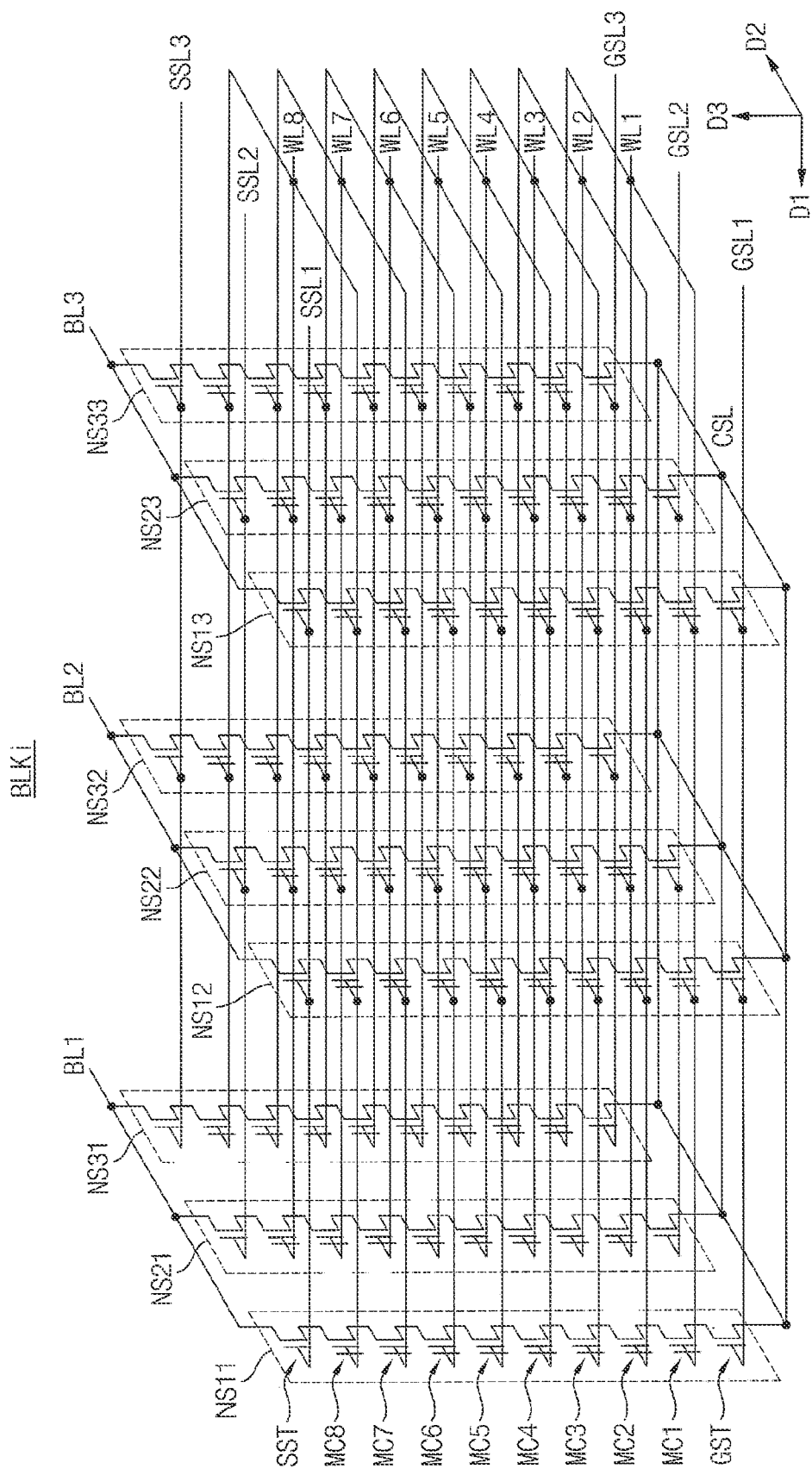
FIG. 18 is a circuit diagram illustrating an equivalent circuit of a memory block described with reference to FIG. 17.

FIG. 18 is a circuit diagram illustrating an equivalent circuit of a memory block described with reference to FIG. 17.

A memory block BLKi shown in FIG. 18 may refer to a 3D memory block having a 3D structure formed on a substrate. For example, a plurality of memory NAND strings included in the memory block BLKi may be formed in a vertical direction to the substrate.

Referring to FIG. 18, the memory block BLKi may include a plurality of memory NAND strings (e.g., NS11 to NS33), which are connected between bitlines BL1, BL2, and BL3 and a common source line CSL. Each of the memory NAND strings NS11 to NS33 may include a string selection transistor SST, a plurality of memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 17, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and GTL8. The gate lines GTL1, GTL2, . . . , and GTL8 may respectively correspond to wordlines, and some of the gate lines GTL1, GTL2, . . . , and GTL8 may correspond to dummy wordlines. The ground selection transistor GST may be connected to ground selection lines GSL1, GSL2, and GSL3 corresponding thereto. The string selection transistor SST may be connected to the bitlines BL1, BL2, and BL3 corresponding thereto, and the ground selection transistor GST may be connected to the common source line CSL.

Wordlines (e.g., WL1) at the same level may be connected in common, and the ground selection lines GSL1, GSL2, and GSL3 and the string selection lines SSL1, SSL2, and SSL3 may be separated from each other. FIG. 18 illustrates a case in which a memory block BLKi is connected to eight gate lines GTL1, GTL2, . . . , and GTL8 and three bitlines BL1, BL2, and BL3, without being limited thereto.

The number of the wordlines WL1 to WL8, the number of the bitlines BL1 to BL3, and the number of memory cells MC1 to MC8 are not limited to the example of FIG. 18.

Although the memory cell array included in the memory device according to exemplary embodiments is described based on a NAND flash memory device, the memory device according to exemplary embodiments may be any volatile memory device, such as a DRAM or an SRAM, or any nonvolatile memory device, e.g., a PRAM, an RRAM, an MRAM, a FRAM, a TRAM, an NFGM, a PoRAM, etc.

Figure 19:
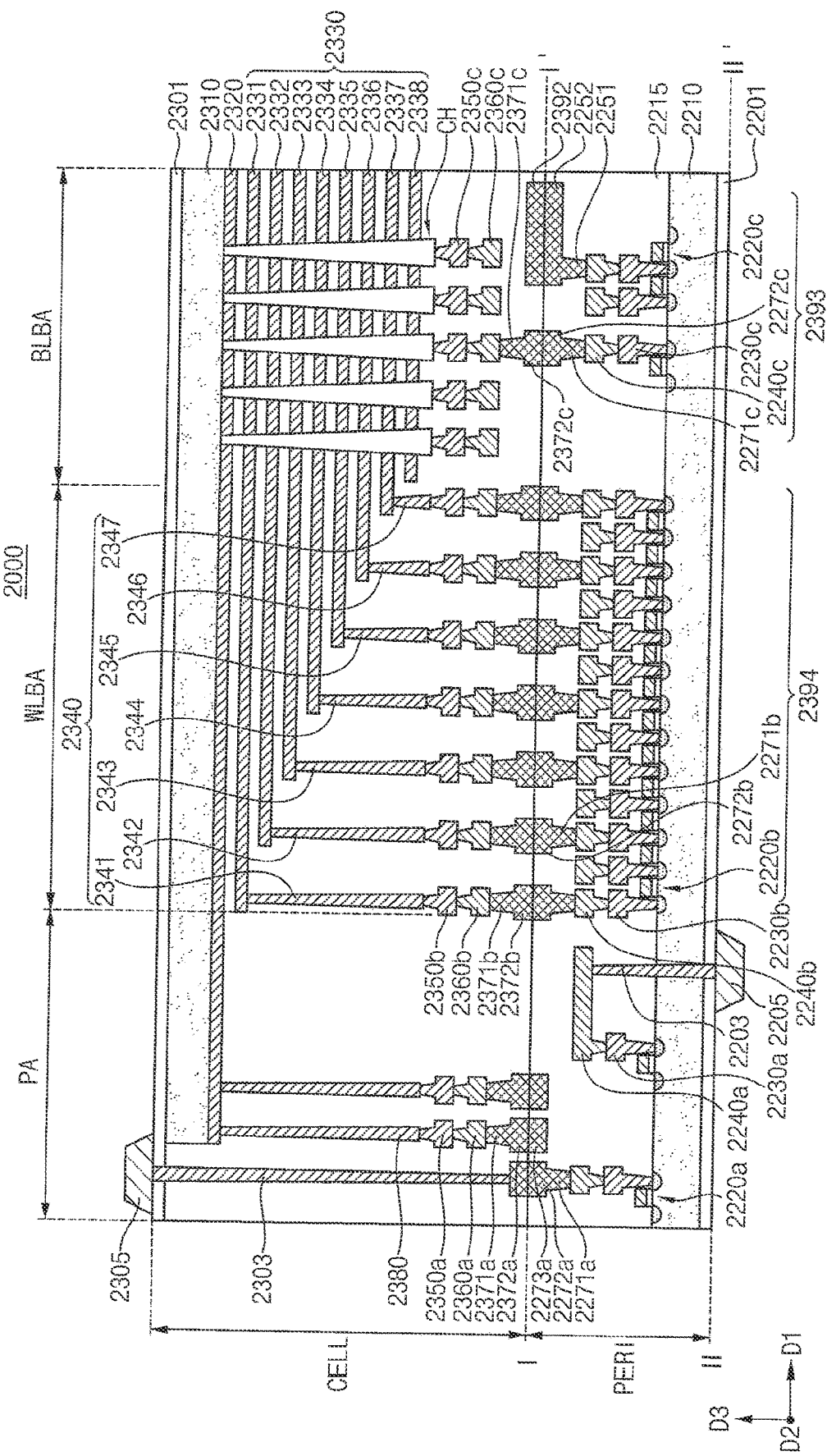
FIG. 19 is a cross-sectional view of a memory device included in a memory system according to exemplary embodiments.

FIG. 19 is a cross-sectional view of a memory device according to exemplary embodiments.

Referring to FIG. 19, a memory device 2000 may have a chip-to-chip (C2C) structure. The C2C structure may refer to a structure formed by manufacturing an upper chip including a memory cell region or a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, the bonding metals may include copper (Cu) using Cu-to-Cu bonding. The exemplary embodiment, however, may not be limited thereto. For example, the bonding metals may also be formed of aluminum (Al) or tungsten (W).

Each of the peripheral circuit region PERI and the cell region CELL of the memory device 2000 may include an external pad bonding area PA, a wordline bonding area WLBA, and a bitline bonding area BLBA.

The peripheral circuit region PERI may include a first substrate 2210, an interlayer insulating layer 2215, a plurality of circuit elements 2220a, 2220b, and 2220c formed on the first substrate 2210, first metal layers 2230a, 2230b, and 2230c respectively connected to the plurality of circuit elements 2220a, 2220b, and 2220c, and second metal layers 2240a, 2240b, and 2240c formed on the first metal layers 2230a, 2230b, and 2230c. In an exemplary embodiment, the first metal layers 2230a, 2230b, and 2230c may be formed of tungsten having relatively high electrical resistivity, and the second metal layers 2240a, 2240b, and 2240c may be formed of copper having relatively low electrical resistivity.

In an exemplary embodiment illustrated in FIG. 19, although only the first metal layers 2230a, 2230b, and 2230c and the second metal layers 2240a, 2240b, and 2240c are shown and described, the exemplary embodiment is not limited thereto, and one or more additional metal layers may be further formed on the second metal layers 2240a, 2240b, and 2240c. At least a portion of the one or more additional metal layers formed on the second metal layers 2240a, 2240b, and 2240c may be formed of aluminum or the like having a lower electrical resistivity than those of copper forming the second metal layers 2240a, 2240b, and 2240c.

The interlayer insulating layer 2215 may be disposed on the first substrate 2210 and cover the plurality of circuit elements 2220a, 2220b, and 2220c, the first metal layers 2230a, 2230b, and 2230c, and the second metal layers 2240a, 2240b, and 2240c. The interlayer insulating layer 2215 may include an insulating material such as silicon oxide, silicon nitride, or the like.

Lower bonding metals 2271b and 2272b may be formed on the second metal layer 2240b in the wordline bonding area WLBA. In the wordline bonding area WLBA, the lower bonding metals 2271b and 2272b in the peripheral circuit region PERI may be electrically bonded to upper bonding metals 2371b and 2372b of the cell region CELL. The lower bonding metals 2271b and 2272b and the upper bonding metals 2371b and 2372b may be formed of aluminum, copper, tungsten, or the like. Further, the upper bonding metals 2371b and 2372b in the cell region CELL may be referred as first metal pads and the lower bonding metals 2271b and 2272b in the peripheral circuit region PERI may be referred as second metal pads.

The cell region CELL may include at least one memory block. The cell region CELL may include a second substrate 2310 and a common source line 2320. On the second substrate 2310, a plurality of wordlines 2331 to 2338 (i.e., 2330) may be stacked in a third direction D3 (e.g., a Z-axis direction), perpendicular to an upper surface of the second substrate 2310. At least one string selection line and at least one ground selection line may be arranged on and below the plurality of wordlines 2330, respectively, and the plurality of wordlines 2330 may be disposed between the at least one string selection line and the at least one ground selection line.

In the bitline bonding area BLBA, a channel structure CH may extend in the third direction D3 (e.g., the Z-axis direction), perpendicular to the upper surface of the second substrate 2310, and pass through the plurality of wordlines 2330, the at least one string selection line, and the at least one ground selection line. The channel structure CH may include a data storage layer, a channel layer, a buried insulating layer, and the like, and the channel layer may be electrically connected to a first metal layer 2350c and a second metal layer 2360c. For example, the first metal layer 2350c may be a bitline contact, and the second metal layer 2360c may be a bitline. In an exemplary embodiment, the bitline 2360c may extend in a second direction D2 (e.g., a Y-axis direction), parallel to the upper surface of the second substrate 2310.

In an exemplary embodiment illustrated in FIG. 19, an area in which the channel structure CH, the bitline 2360c, and the like are disposed may be defined as the bitline bonding area BLBA. In the bitline bonding area BLBA, the bitline 2360c may be electrically connected to the circuit elements 2220c providing a page buffer 2393 in the peripheral circuit region PERI. The bitline 2360c may be connected to upper bonding metals 2371c and 2372c in the cell region CELL, and the upper bonding metals 2371c and 2372c may be connected to lower bonding metals 2271c and 2272c connected to the circuit elements 2220c of the page buffer 2393.

In the wordline bonding area WLBA, the plurality of wordlines 2330 may extend in a first direction D1 (e.g., an X-axis direction), parallel to the upper surface of the second substrate 2310 and perpendicular to the second direction D2, and may be connected to a plurality of cell contact plugs 2341 to 2347 (i.e., 2340). The plurality of wordlines 2330 and the plurality of cell contact plugs 2340 may be connected to each other in pads provided by at least a portion of the plurality of wordlines 2330 extending in different lengths in the first direction D1. A first metal layer 2350b and a second metal layer 2360b may be connected to an upper portion of the plurality of cell contact plugs 2340 connected to the plurality of wordlines 2330, sequentially. The plurality of cell contact plugs 2340 may be connected to the peripheral circuit region PERI by the upper bonding metals 2371b and 2372b of the cell region CELL and the lower bonding metals 2271b and 2272b of the peripheral circuit region PERI in the wordline bonding area WLBA.

The plurality of cell contact plugs 2340 may be electrically connected to the circuit elements 2220b forming a row decoder 2394 in the peripheral circuit region PERI. In an exemplary embodiment, operating voltages of the circuit elements 2220b forming the row decoder 2394 may be different than operating voltages of the circuit elements 2220c forming the page buffer 2393. For example, operating voltages of the circuit elements 2220c forming the page buffer 2393 may be greater than operating voltages of the circuit elements 2220b forming the row decoder 2394.

A common source line contact plug 2380 may be disposed in the external pad bonding area PA. The common source line contact plug 2380 may be formed of a conductive material such as a metal, a metal compound, polysilicon, or the like, and may be electrically connected to the common source line 2320. A first metal layer 2350a and a second metal layer 2360a may be stacked on an upper portion of the common source line contact plug 2380, sequentially. For example, an area in which the common source line contact plug 2380, the first metal layer 2350a, and the second metal layer 2360a are disposed, may be defined as the external pad bonding area PA.

Input/output pads 2205 and 2305 may be disposed in the external pad bonding area PA. A lower insulating film 2201 covering a lower surface of the first substrate 2210 may be formed below the first substrate 2210, and a first input/output pad 2205 may be formed on the lower insulating film 2201. The first input/output pad 2205 may be connected to at least one of the plurality of circuit elements 2220a, 2220b, and 2220c disposed in the peripheral circuit region PERI through a first input/output contact plug 2203, and may be separated from the first substrate 2210 by the lower insulating film 2201. In addition, a side insulating film may be disposed between the first input/output contact plug 2203 and the first substrate 2210 to electrically separate the first input/output contact plug 2203 and the first substrate 2210.

An upper insulating film 2301 covering the upper surface of the second substrate 2310 may be formed on the second substrate 2310, and a second input/output pad 2305 may be disposed on the upper insulating layer 2301. The second input/output pad 2305 may be connected to at least one of the plurality of circuit elements 2220a, 2220b, and 2220c disposed in the peripheral circuit region PERI through a second input/output contact plug 2303. In the exemplary embodiment, the second input/output pad 2305 is electrically connected to a circuit element 2220a.

According to exemplary embodiments, the second substrate 2310 and the common source line 2320 may not be disposed in an area in which the second input/output contact plug 2303 is disposed. Also, the second input/output pad 2305 may not overlap the wordlines 2330 in the third direction D3 (e.g., the Z-axis direction). The second input/output contact plug 2303 may be separated from the second substrate 2310 in the direction, parallel to the upper surface of the second substrate 2310, and may pass through the interlayer insulating layer 2315 of the cell region CELL to be connected to the second input/output pad 2305.

According to exemplary embodiments, the first input/output pad 2205 and the second input/output pad 2305 may be selectively formed. For example, the memory device 2000 may include only the first input/output pad 2205 disposed on the first substrate 2210 or the second input/output pad 2305 disposed on the second substrate 2310. Alternatively, the nonvolatile memory device 2000 may include both the first input/output pad 2205 and the second input/output pad 2305.

A metal pattern provided on an uppermost metal layer may be provided as a dummy pattern or the uppermost metal layer may be omitted, in each of the external pad bonding area PA and the bitline bonding area BLBA, respectively included in the cell region CELL and the peripheral circuit region PERI.

In the external pad bonding area PA, the memory device 2000 may include a lower metal pattern 2273a, corresponding to an upper metal pattern 2372a formed in an uppermost metal layer of the cell region CELL, and having the same cross-sectional shape as the upper metal pattern 2372a of the cell region CELL so as to be connected to each other, in an uppermost metal layer of the peripheral circuit region PERI. In the peripheral circuit region PERI, the lower metal pattern 2273a formed in the uppermost metal layer of the peripheral circuit region PERI may not be connected to a contact. Similarly, in the external pad bonding area PA, an upper metal pattern 2372a, corresponding to the lower metal pattern 2273a formed in an uppermost metal layer of the peripheral circuit region PERI, and having the same shape as a lower metal pattern 2273*a* of the peripheral circuit region PERI, may be formed in an uppermost metal layer of the cell region CELL.

The lower bonding metals 2271*b* and 2272*b* may be formed on the second metal layer 2240*b* in the wordline bonding area WLBA. In the wordline bonding area WLBA, the lower bonding metals 2271*b* and 2272*b* of the peripheral circuit region PERI may be electrically connected to the upper bonding metals 2371*b* and 2372*b* of the cell region CELL by a Cu-to-Cu bonding.

Further, in the bitline bonding area BLBA, an upper metal pattern 2392, corresponding to a lower metal pattern 2252 formed in the uppermost metal layer of the peripheral circuit region PERI, and having the same cross-sectional shape as the lower metal pattern 2252 of the peripheral circuit region PERI, may be formed in an uppermost metal layer of the cell region CELL. A contact may be omitted on the upper metal pattern 2392 formed in the uppermost metal layer of the cell region CELL.

In an exemplary embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may be omitted on the reinforcement metal pattern.

The inventive concept may be applied to various devices and systems that include memory devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable electronic device, an internet of things (IoT) device, an internet of everything (IoE) device, an e-book reader, a virtual reality (VR) device, an augmented reality (AR) device, a robotic device, a drone, etc.

The foregoing is illustrative of exemplary embodiments and is not to be construed as limiting thereof. Although some exemplary embodiments have been described, those skilled in the art will readily appreciate that many modifications are possible in the exemplary embodiments without materially departing from the novel teachings and advantages of such exemplary embodiments. Accordingly, all such modifications are intended to be included within the scope of the exemplary embodiments as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A memory controller of a memory system including a memory device and the memory controller, the memory controller comprising:
   a buffer memory including memory banks;
   one or more host access units configured to perform an access to the buffer memory for a host;
   one or more memory access units configured to perform an access to the buffer memory for the memory device; and
   a processor configured to control an operation of the memory controller,
   wherein the processor is further configured to divide the memory banks into an external memory bank group for an external operation related to the host, and an internal memory bank group for an internal operation within the memory system,
   wherein the processor is further configured to change the external memory bank group of the memory banks and the internal memory bank group of the memory banks according to traffic amounts of the internal and external operations,
   wherein the host access units are further configured to access the external memory bank group, and
   wherein the memory access units are further configured to access the external memory bank group to perform the external operation, and to access the internal memory bank group to perform the internal operation.

2. The memory controller of claim 1, wherein the external operation includes a data write operation that writes write data received from the host to the memory device, and a data read operation that provides read data read from the memory device to the host, and
   wherein the internal operation includes a garbage collection operation for the memory device.

3. The memory controller of claim 1, wherein the processor includes:
   a host access manager configured to control the host access units; and
   a memory access manager configured to control the memory access units.

4. The memory controller of claim 3, wherein the host access manager manages external bank index pools respectively corresponding to the memory banks within the external memory bank group,
   wherein the memory access manager manages internal bank index pools respectively corresponding to the memory banks within the internal memory bank group,
   wherein the host access units access the external memory bank group based on a first buffer index within the external bank index pools received from the host access manager, and
   wherein the memory access units access the external memory bank group based on the first buffer index received through the memory access manager from the host access manager to perform the external operation, and access the internal memory bank group based on a second buffer index within the internal bank index pools received from the memory access manager to perform the internal operation.

5. The memory controller of claim 4, wherein the processor further includes:
   a buffer allocator configured to manage whether each of buffers of the memory banks of the buffer memory is available.

6. The memory controller of claim 5, wherein, when a number of buffer indexes of a first external bank index pool of the external bank index pools is less than a reference number, the host access manager transfers a buffer index request including a bank address of a first memory bank corresponding to the first external bank index pool among the memory banks within the external memory bank group to the buffer allocator, and
   wherein, in response to the buffer index request including the bank address of the first memory bank, the buffer allocator identifies the first memory bank having the bank address among the memory banks of the buffer memory, and transfers a buffer index of an available buffer among the buffers of the first memory bank to the host access manager.

7. The memory controller of claim 5, wherein, when a number of buffer indexes of a first internal bank index pool of the internal bank index pools is less than a reference number, the memory access manager transfers a buffer index request including a bank address of a second memory bank corresponding to the first internal bank index pool among the memory banks within the internal memory bank group to the buffer allocator, and
wherein, in response to the buffer index request including the bank address of the second memory bank, the buffer allocator identifies the second memory bank having the bank address among the memory banks of the buffer memory, and transfers a buffer index of an available buffer among the buffers of the second memory bank to the memory access manager.

8. The memory controller of claim 1, wherein the processor compares a first traffic amount of the external operation and a second traffic amount of the internal operation, and
wherein, when a difference between the first traffic amount and the second traffic amount is greater than or equal to a reference traffic amount, the processor increases a number of the memory banks included in a first one of the external memory bank group and the internal memory bank group, and decreases a number of the memory banks included in a second one of the external memory bank group and the internal memory bank group.

9. The memory controller of claim 1, wherein the processor further divides the external memory bank group into a plurality of external memory bank sub-groups respectively corresponding to the host access units.

10. The memory controller of claim 1, wherein the host access units include a first host access unit and a second host access unit,
wherein the processor further divides the external memory bank group into a first external memory bank sub-group for the first host access unit and a second external memory bank sub-group for the second host access unit,
wherein the first host access unit accesses at least one memory bank within the first external memory bank sub-group among the memory banks of the buffer memory, and
wherein the second host access unit accesses at least one memory bank within the second external memory bank sub-group among the memory banks of the buffer memory.

11. The memory controller of claim 1, wherein the memory controller is connected to the memory device through a plurality of channels, and
wherein the memory access units are allocated to different ones of the plurality of channels.

12. The memory controller of claim 1, wherein the processor includes a memory access manager configured to manage internal bank index pools respectively corresponding to the memory banks within the internal memory bank group, and
wherein, when the internal operation is performed, the memory access manager selects one internal bank index pool in a round robin manner from the internal bank index pools, and transfers a buffer index within the selected one internal bank index pool to the memory access units.

13. The memory controller of claim 1, wherein the processor further divides the internal memory bank group into a plurality of internal memory bank sub-groups respectively corresponding to the memory access units.

14. The memory controller of claim 1, wherein the memory access units include a first memory access unit and a second memory access unit,
wherein the processor further divides the internal memory bank group into a first internal memory bank sub-group for the first memory access unit and a second internal memory bank sub-group for the second memory access unit,
wherein the first memory access unit accesses at least one memory bank within the first internal memory bank sub-group among the memory banks of the buffer memory to perform the internal operation, and
wherein the second memory access unit accesses at least one memory bank within the second internal memory bank sub-group among the memory banks of the buffer memory to perform the internal operation.

15. The memory controller of claim 1, wherein the processor further divides the external memory bank group into a plurality of external memory bank sub-groups respectively corresponding to the host access units,
wherein a first external memory bank sub-group of the plurality of external memory bank sub-groups includes first and second memory banks of the memory banks, and
wherein a first host access unit corresponding to the first external memory bank sub-group among the host access units alternately accesses the first memory bank and the second memory bank.

16. The memory controller of claim 1, wherein the processor further divides the external memory bank group into a plurality of external memory bank function groups respectively corresponding to a plurality of function identifiers.

17. The memory controller of claim 16, wherein the memory controller receives a host command including one function identifier among the plurality of function identifiers, and
wherein the host access units access one of the plurality of external memory bank function groups corresponding to the one function identifier.

18. The memory controller of claim 16, wherein the processor further divides each of the plurality of external memory bank function groups into a plurality of external memory bank sub-groups respectively corresponding to the host access units.

19. A memory controller of a memory system including a memory device and the memory controller, the memory controller comprising:
a buffer memory including memory banks;
one or more host access units configured to perform an access to the buffer memory for a host;
one or more memory access units configured to perform an access to the buffer memory for the memory device; and
a processor configured to control an operation of the memory controller,
wherein the processor includes:
a host access manager configured to control the host access units;
a memory access manager configured to control the memory access units; and a buffer allocator configured to manage whether each of buffers of the memory banks of the buffer memory is available, wherein the processor is further configured to divide the memory banks into an external memory bank group for an external operation related to the host, and an internal memory bank group for an internal operation within the memory system, wherein the processor is further configured to change the external memory bank group of the memory banks and the internal memory bank group of the memory banks according to traffic amounts of the internal and external operations, wherein the host access manager manages external bank index pools respectively corresponding to the memory banks within the external memory bank group, wherein the memory access manager manages internal bank index pools respectively corresponding to the memory banks within the internal memory bank group, wherein the host access units access the external memory bank group based on a first buffer index within the external bank index pools received from the host access manager, and wherein the memory access units access the external memory bank group based on the first buffer index received through the memory access manager from the host access manager to perform the external operation, and access the internal memory bank group based on a second buffer index within the internal bank index pools received from the memory access manager to perform the internal operation.

20. A memory system comprising:
a memory device; and
a memory controller configured to control an operation of the memory device,
wherein the memory controller includes:
- a buffer memory including memory banks;
- one or more host access units configured to perform an access to the buffer memory for a host;
- one or more memory access units configured to perform an access to the buffer memory for the memory device; and
- a processor configured to control an operation of the memory controller, wherein the processor is further configured to divide the memory banks into an external memory bank group for an external operation related to the host, and an internal memory bank group for an internal operation within the memory system, wherein the processor is further configured to change the external memory bank group of the memory banks and the internal memory bank group of the memory banks according to traffic amounts of the internal and external operations, wherein the host access units are further configured to access the external memory bank group, and wherein the memory access units are further configured to access the external memory bank group to perform the external operation, and to access the internal memory bank group to perform the internal operation.

* * * * *